US010902344B1

(12) United States Patent
Kenthapadi et al.

(10) Patent No.: US 10,902,344 B1
(45) Date of Patent: Jan. 26, 2021

(54) MACHINE LEARNING MODEL TO ESTIMATE CONFIDENTIAL DATA VALUES BASED ON JOB POSTING

(71) Applicant: Microsoft Technology Licensing, LLC, Redmond, WA (US)

(72) Inventors: Krishnaram Kenthapadi, Sunnyvale, CA (US); Stuart MacDonald Ambler, Longmont, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 711 days.

(21) Appl. No.: 15/339,297

(22) Filed: Oct. 31, 2016

(51) Int. Cl.
*G06N 20/00* (2019.01)
*G06Q 50/00* (2012.01)
*G06F 21/62* (2013.01)

(52) U.S. Cl.
CPC ......... *G06N 20/00* (2019.01); *G06F 21/6245* (2013.01); *G06Q 50/01* (2013.01)

(58) Field of Classification Search
CPC ...... G06N 20/00; G06N 99/005; G06N 5/025; G06N 7/005; G06F 21/62; G06F 21/60; G06Q 50/01; G06K 9/6256; G06K 9/6269
USPC .......................................................... 706/12
See application file for complete search history.

(56) References Cited

U.S. PATENT DOCUMENTS

| | | | |
|---|---|---|---|
| 6,728,695 B1 * | 4/2004 | Pathria ................. | G06F 17/2715 |
| 7,870,079 B2 | 1/2011 | McGovern et al. | |
| 8,001,057 B1 * | 8/2011 | Hill ..................... | G06Q 10/1053 |
| | | | 705/1.1 |
| 8,583,471 B1 * | 11/2013 | Voskuhl ............. | G06Q 30/0254 |
| | | | 705/14.53 |
| 8,600,931 B1 | 12/2013 | Wehrle et al. | |
| 8,694,540 B1 * | 4/2014 | Lin ...................... | G06F 16/211 |
| | | | 707/777 |
| 8,914,383 B1 | 12/2014 | Weinstein et al. | |

(Continued)

FOREIGN PATENT DOCUMENTS

| | | |
|---|---|---|
| CA | 2450439 A1 * 12/2002 | ........... G06Q 10/105 |
| WO | 2010056201 A1 5/2010 | |

OTHER PUBLICATIONS

Custers et al.—"Using sensitive personal data may be necessary for avoiding discrimination in data-driven decision models"—May 7, 2016—https://link.springer.com/article/10.1007/s10506-016-9182-5 (Year: 2016).*

(Continued)

*Primary Examiner* — Viker A Lamardo
(74) *Attorney, Agent, or Firm* — Schwegman Lundberg & Woessner, P.A.

(57) ABSTRACT

In an example, one or more job postings, as well as corresponding confidential data values, are obtained from a social networking service. A first set of one or more features are extracted from the one or more job postings. The first set of one or more features and corresponding confidential data values are fed into a machine learning algorithm to train a confidential data value prediction model to output a predicted confidential data value for a candidate job posting. Then, the candidate job posting is obtained and a second set of one or more features are extracted from the candidate job posting. The extracted second set of one or more features is fed to the confidential data value prediction model, outputting the predicted confidential data value.

20 Claims, 17 Drawing Sheets

(56) References Cited

U.S. PATENT DOCUMENTS

| | | | |
|---|---|---|---|
| 9,183,282 | B2 | 11/2015 | Singh et al. |
| 9,787,705 | B1 | 10/2017 | Love et al. |
| 10,509,695 | B1 | 12/2019 | Averbuch et al. |
| 2007/0055621 | A1 | 3/2007 | Tischler et al. |
| 2007/0124235 | A1 | 5/2007 | Chakraborty et al. |
| 2008/0065467 | A1* | 3/2008 | Nyegaard .............. G06Q 10/00 705/7.32 |
| 2011/0196802 | A1 | 8/2011 | Ellis et al. |
| 2014/0012786 | A1 | 1/2014 | Coleman et al. |
| 2014/0058954 | A1* | 2/2014 | Perlstein ............ G06Q 10/1053 705/80 |
| 2014/0074738 | A1* | 3/2014 | Thankappan ...... G06Q 10/1053 705/321 |
| 2014/0089216 | A1 | 3/2014 | Costa et al. |
| 2014/0122355 | A1* | 5/2014 | Hardtke ............... G06Q 10/105 705/321 |
| 2014/0236965 | A1* | 8/2014 | Yarmus .................. G06F 16/22 707/748 |
| 2014/0372358 | A1 | 12/2014 | Zhou et al. |
| 2015/0120755 | A1 | 4/2015 | Burger et al. |
| 2015/0127565 | A1 | 5/2015 | Chevalier et al. |
| 2015/0229666 | A1 | 8/2015 | Foster et al. |
| 2015/0269526 | A1 | 9/2015 | Brown |
| 2015/0278960 | A1 | 10/2015 | Moore et al. |
| 2015/0347954 | A1* | 12/2015 | Stern .............. G06Q 10/063112 705/7.14 |
| 2015/0379430 | A1* | 12/2015 | Dirac .................... G06N 20/00 706/12 |
| 2017/0004452 | A1* | 1/2017 | Feng .................. G06F 16/2379 |
| 2017/0017886 | A1 | 1/2017 | Gao et al. |
| 2017/0270485 | A1* | 9/2017 | Meier ............. G06Q 10/06398 |
| 2017/0344620 | A1 | 11/2017 | Modarresi |
| 2018/0039945 | A1* | 2/2018 | Posse ................. G06Q 10/1053 |
| 2018/0082211 | A1* | 3/2018 | Allen .................. G06F 16/9535 |

OTHER PUBLICATIONS

"Non Final Office Action Issued in U.S. Appl. No. 15/339,272", dated Jul. 10, 2019, 15 Pages.

"Final Office Action Issued in U.S. Appl. No. 15/339,272", dated Jan. 8, 2020, 16 Pages.

Guo, et al., "Personal Credit Profiling via Latent User Behavior Dimensions on Social Media", In Proceedings of the Pacific-Asia Conference on Knowledge Discovery and Data Mining, Apr. 19, 2016, pp. 130-142.

Heaton, et al., "Deep Learning in Finance", In Journal of Computing Research Repository, Feb. 23, 2016, 20 Pages.

Kosinski, et al., "Private Traits and Attributes Are Predictable From Digital Records of Human Behavior", In Proceedings of the National Academy of Sciences of the United States of America, Apr. 9, 2013, pp. 5802-5805.

Mislove, et al., "You Are Who You Know: Inferring User Profiles in Online Social Networks", In Proceedings of the Third ACM International Conference on Web search and Data Mining, Feb. 4, 2010, pp. 251-260.

Yang, Yuhao, "Protecting Attributes and Contents in Online Social Networks", In Doctoral Thesis Submitted to University of Kansas, Oct. 6, 2014, 147 Pages.

Zliobaite, Indre, et al., "Using sensitive personal data may be necessary for avoiding discrimination in data-driven models", Artificial Intelligence Law, No. 24, pp. 183-201, (May 7, 2016), 19 pgs.

\* cited by examiner

600

| TRANSACTION ID 604 | CONFIDENTIAL DATA 606 |
|---|---|
| ZZZ | XXX |
| ZZZ | XXX |
| ZZZ | XXX |
| ZZZ | XXX |
| ZZZ | XXX |

602

| TRANSACTION ID 608 | MEMBER ID 610 | TIMESTAMP 612 | FIRST ATTRIBUTE 614 | SECOND ATTRIBUTE 616 |
|---|---|---|---|---|
| ZZZ | YYY | 5/31/16 04:15:15 | SAN FRANCISCO | SOFTWARE ENGINEER |
| ZZZ | YYY | 5/31/16 10:15:12 | LOS ANGELES | SOFTWARE ENGINEER |
| ZZZ | YYY | 6/1/16 01:12:12 | LOS ANGELES | PRODUCT MANAGER |
| ZZZ | YYY | 6/2/16 23:15:59 | DALLAS | VICE PRESIDENT, SALES |
| ZZZ | YYY | 6/3/16 05:43:12 | NEW YORK | HR BUSINESS PARTNER |

MACHINE LEARNING MODEL TO ESTIMATE CONFIDENTIAL DATA VALUES BASED ON JOB POSTING

TECHNICAL FIELD

The present disclosure generally relates to computer technology for solving technical challenges in collection and maintenance of confidential data in a computer system. More specifically, the present disclosure relates to using a machine learning model to predict confidential data values based on a job posting.

BACKGROUND

In various types of computer systems, there may be a need to collect, maintain, and utilize confidential data. In some instances, users may be reluctant to share this confidential data because of privacy concerns. These concerns extend not only to pure security concerns, such as concerns over whether third parties such as hackers may gain access to the confidential data, but also to how the computer system itself may utilize the confidential data. With certain types of data, users providing the data may be somewhat comfortable with uses of the data that maintain anonymity, such as the confidential data merely being used to provide broad statistical analysis to other users.

One example of such confidential data is salary/compensation information. It may be desirable for a service such as a social networking service to entice its members to provide information about their salary or other work-related compensation in order to provide members with insights as to various metrics regarding salary/compensation, such as an average salary for a particular job type in a particular city. There are technical challenges encountered, however, in ensuring that such confidential data remains confidential and is only used for specific purposes, and it can be difficult to convince members to provide such confidential data due to their concerns that these technical challenges may not be met. Additionally, even once these concerns are met, it can be challenging to provide relevant insights from the confidential data, as oftentimes the submitted confidential data is sparse. What is needed is a mechanism to infer confidential data values for members who have not submitted confidential data values.

BRIEF DESCRIPTION OF THE DRAWINGS

Some embodiments of the technology are illustrated, by way of example and not limitation, in the figures of the accompanying drawings.

FIG. 6 is a diagram illustrating an example of a first submission table and a second submission table, in accordance with an example embodiment.

DETAILED DESCRIPTION

The present disclosure describes, among other things, methods, systems, and computer program products. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, an architecture is provided that gathers confidential information from users, tracks the submission of the confidential information, and maintains and utilizes the confidential information in a secure manner while ensuring that the confidential information is accurate and reliable.

Figure 1:
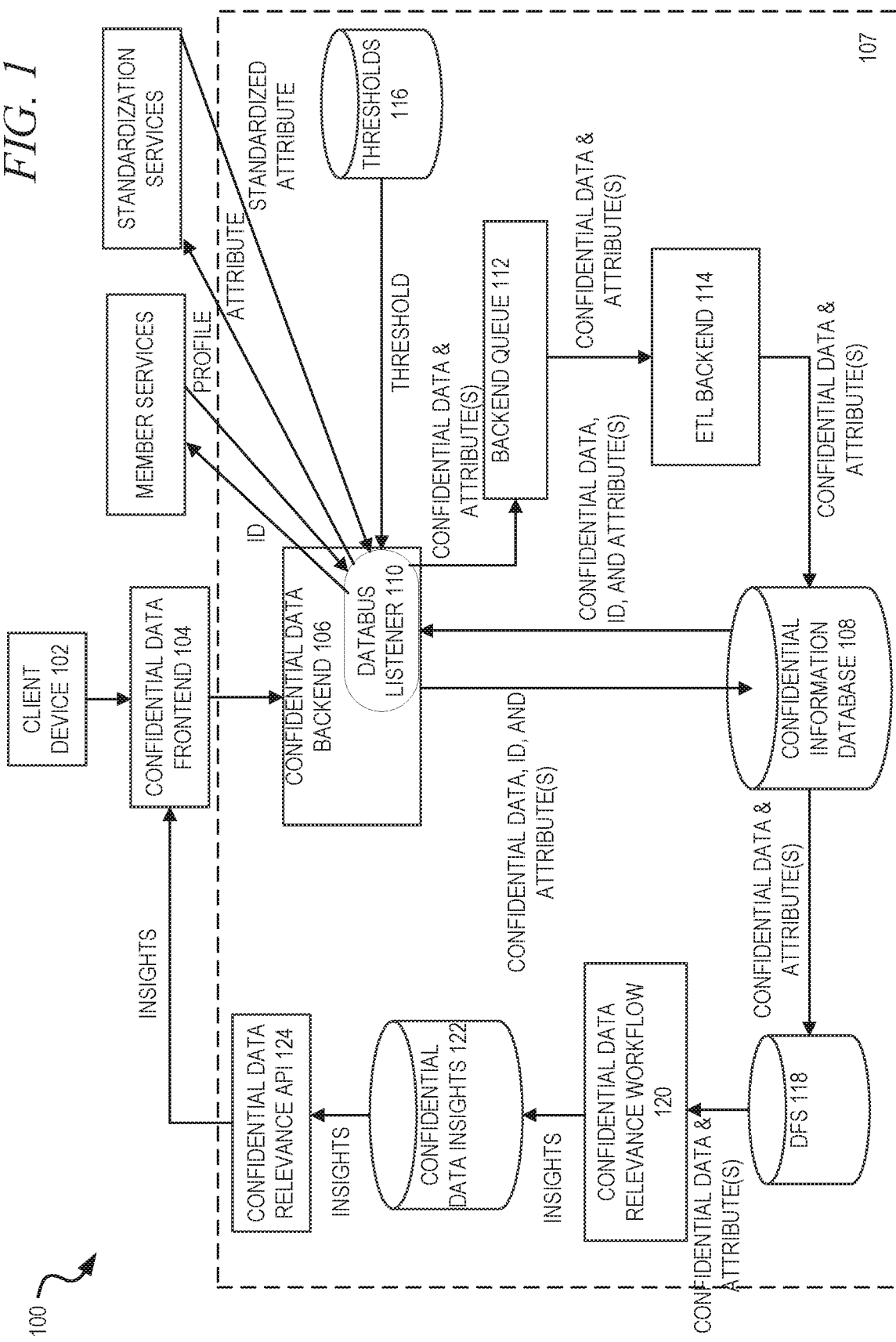
FIG. 1 is a block diagram illustrating a confidential data collection, tracking, and usage system, in accordance with an example embodiment.

FIG. 1 is a block diagram illustrating a confidential data collection, tracking, and usage system 100, in accordance with an example embodiment. A client device 102 may utilize a confidential data frontend 104 to submit confidential information to a confidential data backend 106. In some example embodiments, the confidential data backend 106 is located on a server-side or cloud platform 107, while the confidential data frontend 104 is directly connected to or embedded in the client device 102. However, in some example embodiments, the confidential data frontend 104 is also located on the server-side or cloud platform 107.

There may be various different potential implementations of the confidential data frontend 104, depending upon the type and configuration of the client device 102. In an example embodiment, the confidential data frontend 104 may be a web page that is served to a web browser operating on the client device 102. The web page may include various scripts, such as Javascript code, in addition to Hypertext Markup Language (HTML) and Cascading Style Sheets (CSS) code designed to perform various tasks that will be described in more detail below. The web page may be served in response to a user selecting a link in a previous communication or web page. For example, the link may be displayed in an email communication to the user, or as part of a feed section of the user's social networking service member page. This allows the entity operating the confidential data collection, tracking, and usage system 100 to selectively target users to request that they submit confidential information. For example, the entity may determine that there is a need to obtain more salary information for users from Kansas and then may send out communications to, or cause the social networking service to alter feeds of, users from Kansas in a manner that allows the users to select the link to launch the confidential data frontend 104.

In another example embodiment, the confidential data frontend 104 may be built into an application installed on the client device 102, such as a standalone application running on a smartphone. Again this confidential data frontend 104 is designed to perform various tasks that will be described in more detail below.

One task that the confidential data frontend 104 may be designed to perform is the gathering of confidential data from a user of the client device 102. Another task that the confidential data frontend 104 may be designed to perform is to display insights from confidential data contributed by other users. In order to incentivize users to provide certain types of confidential data, in an example embodiment, insights from the confidential data contributed by other users are provided in response to the user contributing his or her own confidential data. As will be described in more detail, a mechanism to ensure that the contribution of confidential data is tracked is provided.

Once the confidential data is received from the user, the confidential data frontend 104 may transmit the confidential data along with an identification of the user (such as a member identification reflecting the user's account with a social networking service) to the confidential data backend 106. In an example embodiment, this may be performed via, for example, a Representational State Transfer (REST) Application Program Interface (API).

The confidential data, along with the identification of the user, may be stored in a submission table by the confidential data backend 106 in a confidential information database 108. In some example embodiments, this submission table may be encrypted in order to ensure security of the information in the submission table. Furthermore, in some example embodiments, the confidential data stored in the submission table may be encrypted using a different key than the identifying information in the submission table. This encryption will be described in more detail below.

In another example embodiment, a random transaction number is generated for each confidential data submission. This random transaction number is stored with the identifying information in one table, and then stored with the confidential data in another table, with each table encrypted separately using a different key. In either this example embodiment or the previous example embodiment, encrypting the identifying information separately from the confidential data (either in one table or in separate tables) provides added security against the possibility that a malicious user could gain access to one or the other. In other words, even if a malicious user gained access to the identifying information by, for example, hacking the encryption used to encrypt the identifying information, that would not allow the malicious user to gain access to the confidential data corresponding to the identifying information, and vice versa. In an example embodiment, the encryption mechanism used is one that is non-deterministic, such that the same information encrypted twice would produce different results in each encryption. In another example embodiment, the transaction number itself is also encrypted, thereby preventing even the act of joining separate tables containing the identifying information and the confidential data.

In an example embodiment, a submission table may also be able to track when submissions were made by users. As such, the submission table may include additional columns such as, for example, a submission identification, an identification of the user who made the submission, an encryption key for the submission, and timestamp information about when the submission was made. The submission table may then be utilized by the confidential data backend 106 to determine, for example, when to share insights from submissions from other users with a particular user. If, for example, the user has previously submitted confidential data and has done so recently (e.g., within the last year), then the confidential data backend 106 may indicate to the confidential data frontend 104 that it should share insights from confidential data from other users with this particular user.

There may be other methods than those described above for determining eligibility of a user for receiving insights from submissions from other users. For example, a predicate expressed in terms of one or more attributes, such as particular demographic or profile-based attributes, may need to be satisfied in order for the user to receive the insights. These attributes can include any such attribute, from location to title, to level of skill, to social networking service activities or status (e.g., about to transition from being an active member to an inactive member), to transactional attributes (e.g., purchased a premium subscription).

Additionally, any combination of the above factors can be used to determine whether the user is eligible for receiving insights from submissions from other users.

Furthermore, the submission table may also include one or more attributes of the user who made the submission. These attributes may be attributes that can be useful in determining a slice to which the user belongs. Slices will be described in more detail below, but generally involve a segment of users sharing common attributes, such as titles, locations, educational levels, and the like. It should be noted that it is not necessary for these attributes to be stored in the submission table. Since an identification of the user is available in the submission table, it may be possible to retrieve the attributes for the user on an as-needed basis, such as by querying a social networking service with the user identification when needed.

A data-bus listener 110 detects when new confidential data is added to the confidential information database 108 and triggers a workflow to handle the new confidential data. First, the databus listener 110 queries a thresholds data store 116 to determine if one or more thresholds for anonymization have been met. Specifically, until a certain number of data points for confidential data have been met, the confidential data collection, tracking, and usage system 100 will not act upon any particular confidential data data point. As will be described in more detail later, these thresholds may be created on a per-slice basis. Each slice may define a segment of users about whom insights may be gathered based on data points from confidential data submitted by users in the slice. For example, one slice may be users with the title "software engineer" located in the "San Francisco Bay Area." If, for example, the confidential data is compensation information, then it may be determined that in order to gain useful insights into the compensation information for a particular title in a particular region, at least ten data points (e.g., compensation information of ten different users) are needed. In this case, the threshold for "software engineer" located in the "San Francisco Bay Area" may be set at ten.

The databus listener 110, therefore, is designed to retrieve the confidential data added to the confidential information database 108, retrieve the threshold for the slice corresponding to attributes of the user (as stored, for example, in the submission table in the confidential information database 108 or retrieved at runtime from a social networking service), determine if the new data point(s) cause the threshold for the corresponding slice to be exceeded, and, if so, or if the threshold had already been exceeded, insert the data in a backend queue 112 for extract, transform, and load (ETL) functions.

In an example embodiment, the thresholds data store 116 contains not just the thresholds themselves but also a running count of how many data points have been received for each slice. In other words, the thresholds data store 116 indicates how close the slice is to having enough data points with which to provide insights. The databus listener 110 may reference these counts when making its determination that a newly submitted data point causes a threshold to be exceeded. Running counts of data points received for each slice are updated in the thresholds data store 116 by the confidential data backend 106.

Since the databus listener 110 only transfers data points for a particular slice to the backend queue 112 once the threshold for that slice has been exceeded, the confidential data data points corresponding to that slice may need to be retrieved from the confidential information database 108 once the threshold is determined to be exceeded. For example, if, as above, the threshold for a particular slice is ten data points, the first nine data points received for that slice may simply be left in the confidential information database 108 and not sent to the backend queue 112. Then, when the tenth data point for the slice is stored in the confidential information database 108, the databus listener 110 may determine that the threshold has been exceeded and retrieve all ten data points for the slice from the confidential information database 108 and send them to the backend queue 112 for processing.

It should be noted that the information obtained by the databus listener 110 from the confidential information database 108 and placed in the backend queue 112 is anonymized. In an example embodiment, no identification of the users who submitted the confidential data is provided to the backend queue 112, Indeed, in some example embodiments, the information provided to the backend queue 112 may simply be the confidential data itself and any information needed in order to properly group the confidential data in one or more slices. For example, if slices are designed to group user confidential data based only on user title, location, and years of experience, other attributes for the user that might have been stored in the confidential information database 108, such as schools attended, may not be transferred to the backend queue 112 when the confidential data tied to those attributes is transferred to the backend queue 112. This further helps to anonymize the data, as it makes it more difficult for people to be able to deduce the identity of a user based on his or her attributes.

It should also be noted that any one piece of confidential data may correspond to multiple different slices, and thus the databus listener 110 may, in some example embodiments, provide the same confidential data to the backend queue 112 multiple times. This can occur at different times as well, because each of the slices may have its own threshold that may be exceeded at different times based on different counts. Thus, for example, compensation data for a user in the "San Francisco Bay Area" with a job title of "software developer" and a school attended of "Stanford University" may be appropriately assigned to one slice of software developers in the San Francisco Bay Area, another slice of Stanford University alums, and another slice of software developers in the United States. All slices may have their own thresholds and counts of confidential data from other users, who may or may not have complete overlap with these three slices.

An ETL backend 114 acts to extract, transform, and load the confidential data to anonymize and group it and place it back in the confidential information database 108 in a different location from that where it was stored in non-anonymized form. It should be noted that in some example embodiments, the anonymization described above with respect to the databus listener 110 may actually be performed by the ETL backend 114. For example, the databus listener 110 may send non-anonymized confidential data along with all attributes to the backend queue 112, and it may be the ETL backend 114 that reviews this data and discards certain elements of it to anonymize it.

In an example embodiment, the confidential data is stored in encrypted format in the confidential information database 108 when the databus listener 110 sends it to the backend queue 112. As such, one function of the ETL backend 114 is to decrypt the confidential data. Encryption and decryption of the confidential data will be discussed in more detail below.

The ETL backend 114 writes the anonymized confidential data and slice information into an ETL table corresponding to the slice in the confidential information database 108. As described earlier, this ETL table may be stored in a different location from that in which the confidential data was stored initially, such as the submission table described earlier.

At a later time, and perhaps using a batch or other periodic process, the information from the ETL table may be loaded in a distributed file system (DFS) 118. A confidential data relevance workflow 120 may then extract relevant information from the DFS 118 and provide one or more insights into the relevant information in a confidential data insights data store 122. A confidential data relevance API 124 may then be utilized to provide insights from the confidential data insights data store 122 to the confidential data frontend 104, which can then display them to a user. As described earlier, these insights may be provided only on a "give-to-get" basis, namely that only users who provide confidential information (and/or have provided it recently) can view insights.

Figure 2A:
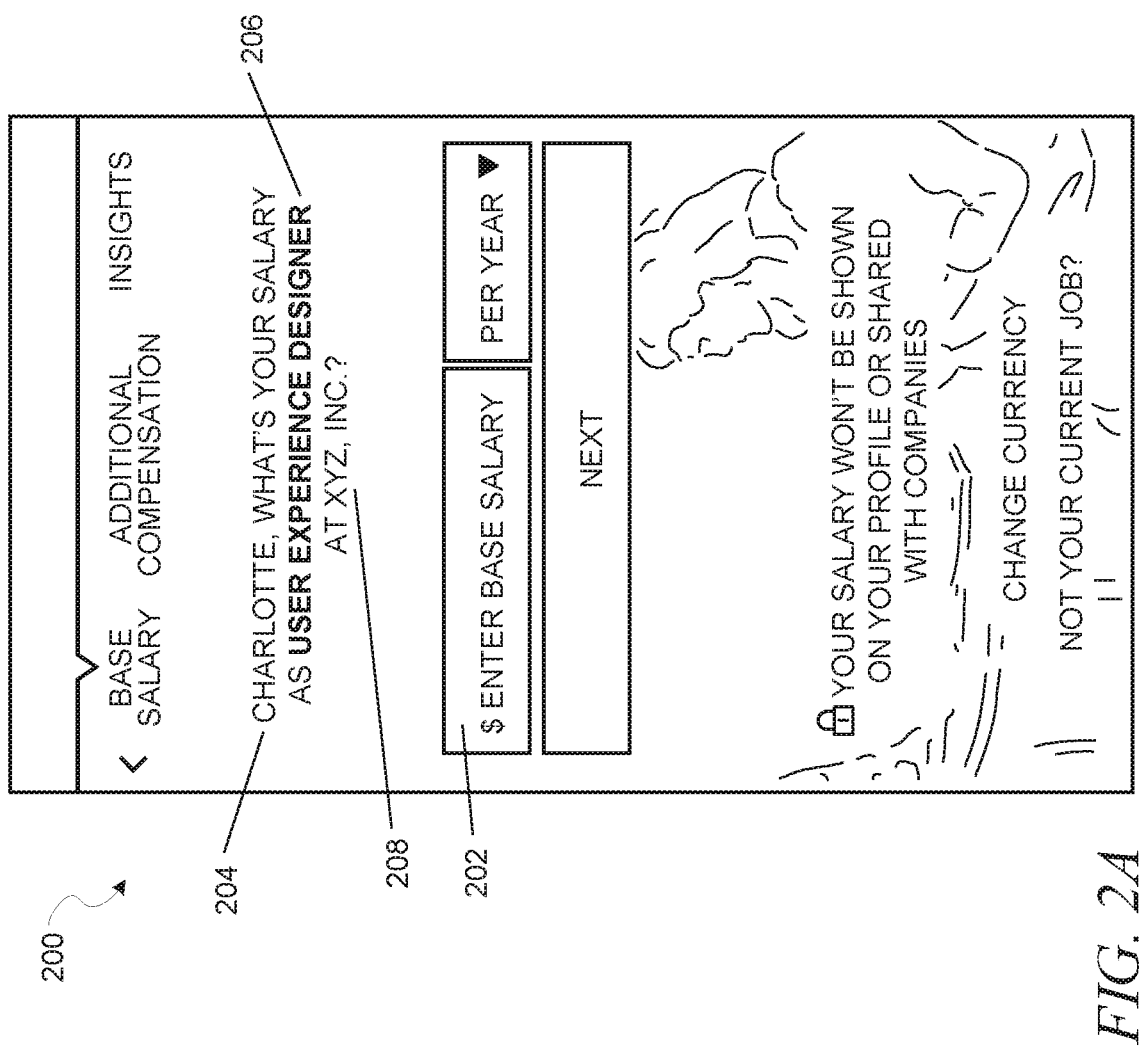
FIGS. 2A-2C are screen captures illustrating an example of a user interface provided by a confidential data frontend, in accordance with an example embodiment.
Figure 2B:
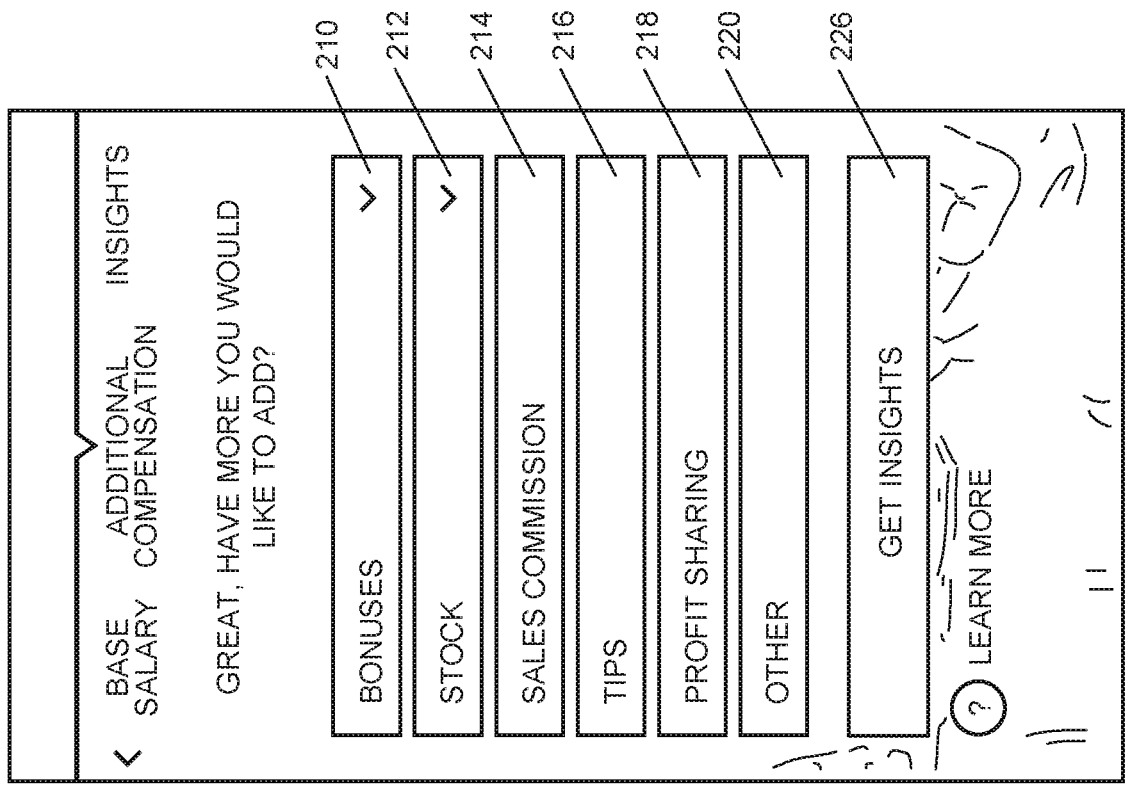
Figure 2C:
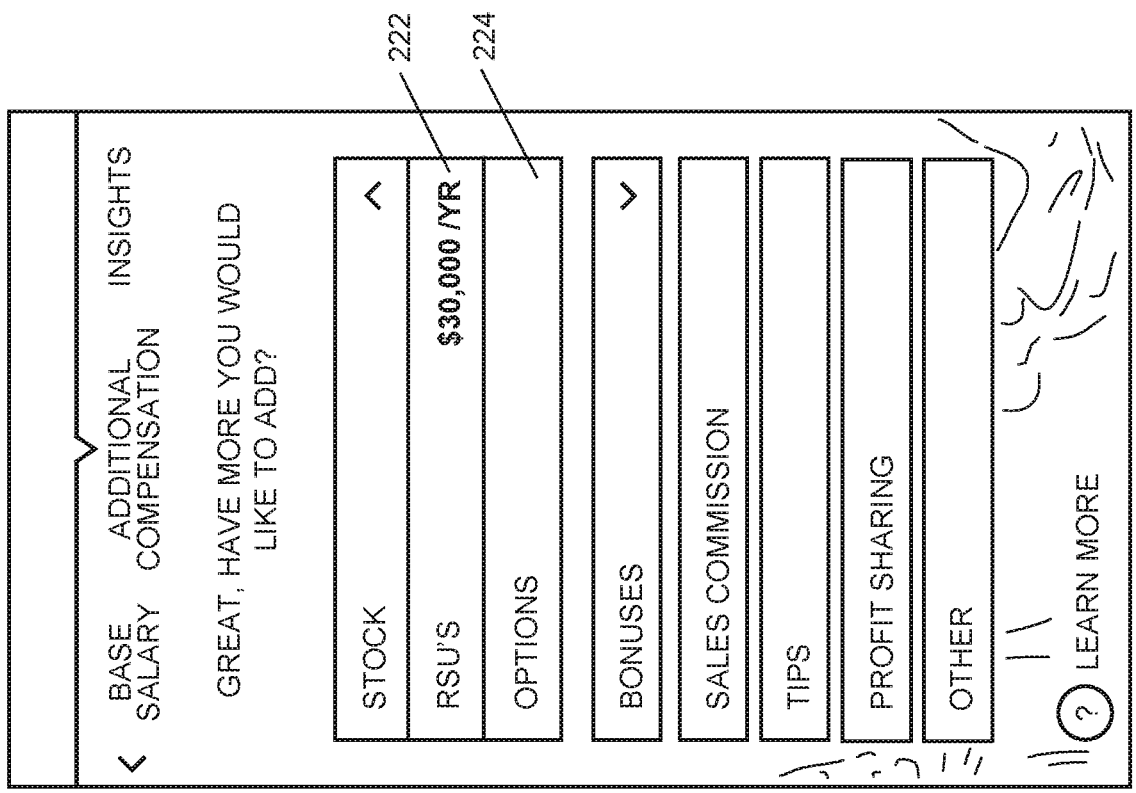

Turning now to more detail about the submission process, FIGS. 2A-2C are screen captures illustrating an example of a user interface 200 provided by the confidential data frontend 104, in accordance with an example embodiment. Referring first to FIG. 2A, the user interface 200 here is depicted as a screen of a standalone application operating on a mobile device, such as a smartphone. In FIG. 2A, the user is prompted to enter a base salary in a text box 202, with a drop-down menu providing options for different time periods by which to measure the base salary (e.g., per year, per month, per hour, etc.). Additionally, the user may be identified by name at 204, the user's title may be identified at 206, and the user's current employer may be identified at 208. This information may be prepopulated into the user interface 200, such as by retrieving this information from a member profile for the user in a social networking service. This eliminates the need for the user to enter this information manually, which can have the effect of dissuading some users from providing the confidential information or completing the submission process, especially on a mobile device where typing or otherwise entering information may be cumbersome.

Turning to FIG. 2B, here the user interface 200 displays a number of other possible compensation types 210-220 from which the user can select. Selecting one of these other possible compensation types 210-220 causes the user interface 200 to provide an additional screen where the user can submit confidential data regarding the selected compensation type 210-220. Here, for example, the user has selected "Stock" 212. Referring now to FIG. 2C, the user interface 200 then switches to this screen, which allows the user to provide various specific details about stock compensation, such as restricted stock unit (RSU) compensation 222 and options 224. The user interface 200 at this stage may also display the other compensation types 210-220 that the user can make additional submissions for.

Referring back to FIG. 2B, when the user has completed entering all the confidential data, such as all the different compensation types appropriate for his or her current job, a "Get insights" button 226 may be selected, which launches a process by which the confidential data backend 106 determines whether the user is eligible to receive insights from confidential data from other users and, if so, indicates to the confidential data backend 106 that the insights should be provided. Additionally, selection of the "Get insights" button 226 represents an indication that the submission of the confidential data by this user has been completed, causing the confidential data backend 106 to store the confidential data in the confidential information database 108 as described below, which then may trigger the databus listener 110 to extract the confidential data and cause the EFL backend 114 to anonymize the confidential data and place it in the appropriate ETL tables corresponding to the appropriate slices in which the confidential data belongs. This permits the submitted confidential data to be available for future insights.

Figure 3:
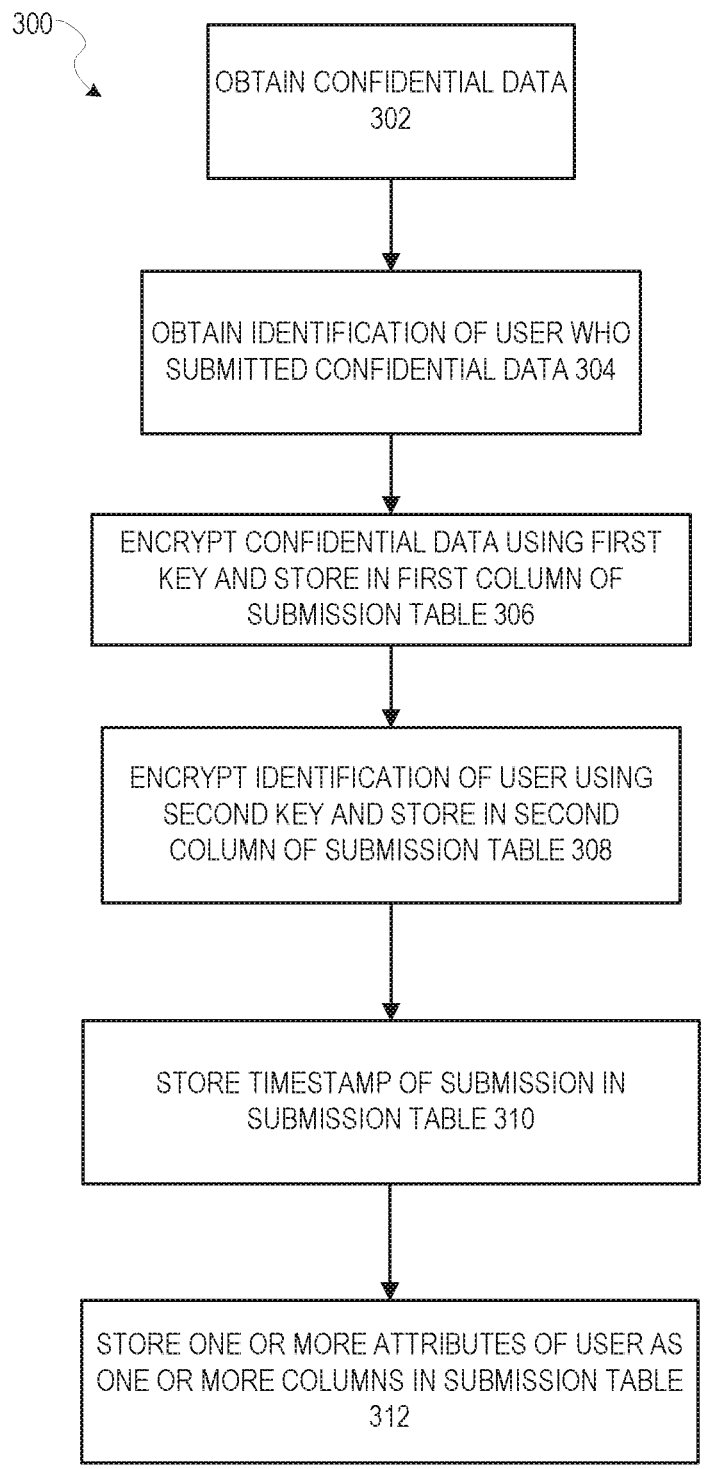
FIG. 3 is a flow diagram illustrating a method for confidential data collection and storage, in accordance with an example embodiment.

FIG. 3 is a flow diagram illustrating a method 300 for confidential data collection and storage; in accordance with an example embodiment. In an example embodiment, the method 300 may be performed by the confidential data backend 106 of FIG. 1. At operation 302, confidential data is obtained. At operation 304, an identification of the user who submitted the confidential data is obtained. It should be noted that, while operations 302 and 304 are listed separately, in some example embodiments they may be performed in the same operation. For example, in an example embodiment, the confidential data frontend 104 may, upon receiving an indication from a user that input of confidential data in the confidential data frontend 104 by the user has been completed, forward the inputted confidential data and an identification of the user to the confidential data backend 106. In other example embodiments, however, the operations 302 and 304 may be performed separately. For example, in an example embodiment, the identification of the user may not be obtained directly from the confidential data frontend 104, but rather some other type of identifying information may be obtained directly from the confidential data frontend 104, and this other type of identifying information may be used to query a social networking service or other third-party service for the identification information for the user. Regardless, after operations 302 and 304 have been performed, the confidential data backend 106 has at its disposal some confidential data and identification information for the user who entered the confidential data.

It should be noted that the confidential data may be a single piece of information, or may be multiple related pieces of information. For example, the confidential data may simply include a total compensation value and nothing more, or may include a complete breakdown of different types of compensation (e.g., base salary, bonus, stock, etc.).

Users are understandably concerned about the security of the confidential data, and specifically about a malicious user being able to correlate the confidential data and the identification of the user (i.e., not just learning the confidential data but tying the confidential data specifically to the user). As such, at operation 306, the confidential data is encrypted using a first key and stored in a first column of a submission table in a confidential information database. Then, at operation 308, the identification of the user who submitted the confidential data is separately encrypted using a second key and stored in a second column of the submission table in the confidential information database.

Additionally, a number of optional pieces of information may, in some example embodiments, be stored in the submission table at this point. At operation 310, a timestamp of the submission of the confidential data may be stored in a column in the submission table. This timestamp may be used in, for example, a determination of whether the user is eligible to receive insights from confidential data submitted by other users. At operation 312, one or more attributes of the user may be stored as one or more columns in the submission table. These attributes may be used, for example, in determining to which slice(s) the confidential data may apply, as will be described in more detail below.

Figure 4:
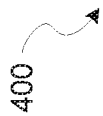
FIG. 4 is a diagram illustrating an example of a submission table, in accordance with an example embodiment.

FIG. 4 is a diagram illustrating an example of a submission table 400, in accordance with an example embodiment. Each row in the submission table 400 corresponds to a different submission. Here, the submission table 400 includes five columns. In a first column 402, confidential data encrypted by a first key is stored. In a second column 404, identification of the user who submitted the corresponding confidential data, encrypted by a second key, is stored. In a third column 406, a timestamp for the submission is stored. In a fourth column 408, a first attribute of the user, here location, is stored. In a fifth column 410, a second attribute of the user, here job title, is stored. Of course, there may be additional columns to store additional attributes or other pieces of information related to the submission.

Notably, FIG. 4 depicts an example embodiment where only the first and second columns 402, 404 are encrypted, using different encryption keys. In some example embodiments, the additional columns 406-410 may also be encrypted, either individually or together. In some example embodiments, one or more of these additional columns 406-410 may be encrypted using the same key as the first or second column 402, 404. Furthermore, in some example embodiments, the submission table 400 may be additionally encrypted as a whole, using a third encryption key different from the keys used to encrypt the first and second columns 402, 404.

It should be noted that while FIGS. 3 and 4 describe the confidential data as being stored in a single column in a submission table, in some example embodiments, this column is actually multiple columns, or multiple sub-columns, with each corresponding to a subset of the confidential data. For example, if the confidential data is compensation information, the confidential data may actually comprise multiple different pieces of compensation information, such as base salary, bonus, stock, tips, and the like. Each of these pieces of compensation information may, in some example embodiments, have its own column in the submission table. Nevertheless, the processes described herein with regard to the "column" in which the confidential data is stored apply equally to the embodiments where multiple columns are used (e.g., the individual pieces of compensation information are still encrypted separately from the user identification information).

Figure 5:
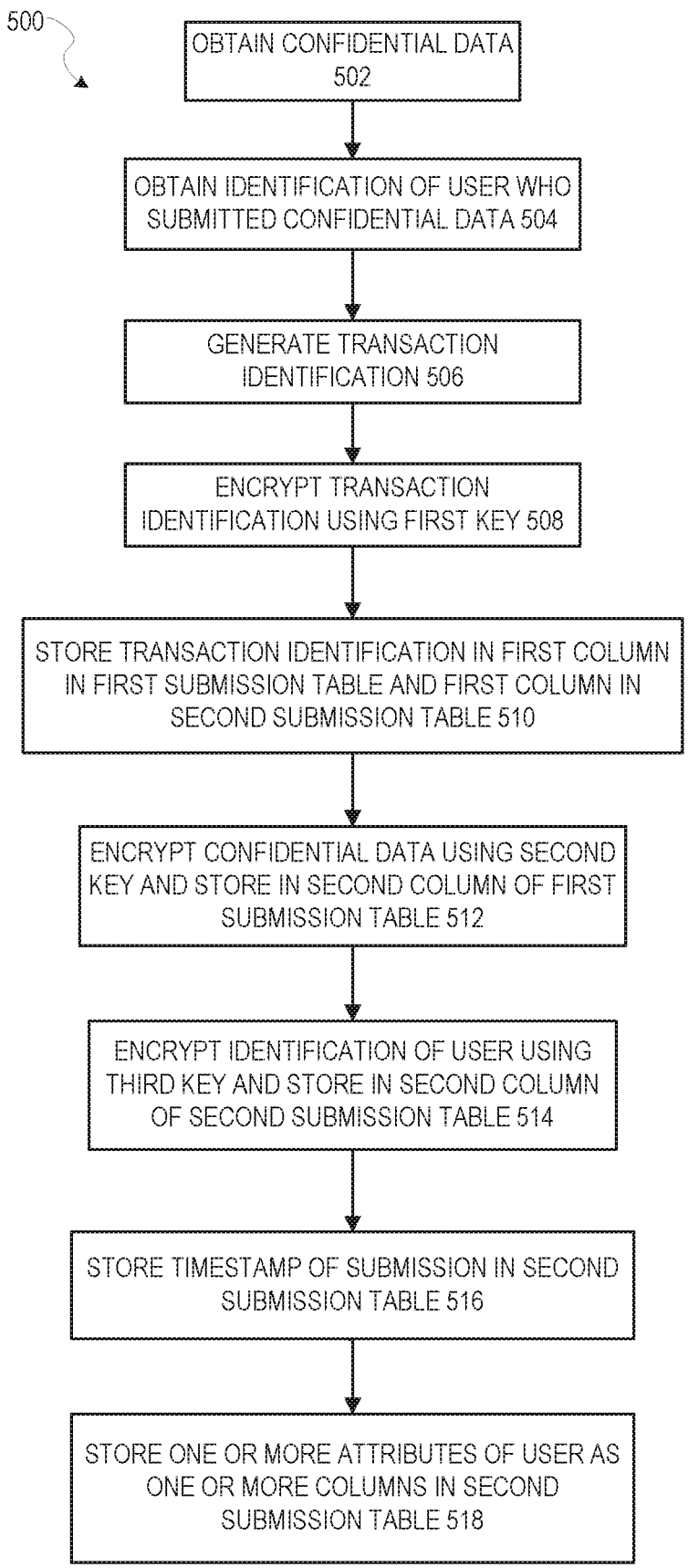
FIG. 5 is a flow diagram illustrating a method for confidential data collection and storage, in accordance with an example embodiment.

FIG. 5 is a flow diagram illustrating a method 500 for confidential data collection and storage, in accordance with an example embodiment. In contrast with FIG. 3, FIG. 5 represents an example embodiment where the confidential data and the identification of the user who submitted the confidential data are stored in separate tables in order to provide additional security. At operation 502, confidential data is obtained. At operation 504, an identification of the user who submitted the confidential data is obtained. As in FIG. 3, while operations 502 and 504 are listed separately, in some example embodiments they may be performed in the same operation.

At operation 506, a transaction identification is generated. This transaction identification may be, for example, a randomly generated number or character sequence that uniquely identifies the submission. At operation 508, the transaction identification may be encrypted using a first key. At operation 510, the transaction identification (either encrypted or not, depending upon whether operation 508 was utilized) is stored in a first column in a first submission table and in a first column in a second submission table in a confidential information database.

At operation 512, the confidential data is encrypted using a second key and stored in a second column of the first submission table in the confidential information database. Then, at operation 514, the identification of the user who submitted the confidential data is separately encrypted using a third key and stored in a second column of the second submission table in the confidential information database.

Additionally, as in FIG. 3, a number of optional pieces of information may, in some example embodiments, be stored in the first and/or second submission tables at this point. At operation 516, a timestamp of the submission of the confidential data may be stored in a column in the second submission table. This timestamp may be used in, for example, a determination of whether the user is eligible to receive insights from confidential data submitted by other users. At operation 518, one or more attributes of the user may be stored as one or more columns in the second submission table. These attributes may be used, for example, in determining to which slice(s) the confidential data may apply, as will be described in more detail below. It should be noted that while operations 516 and 518 are described as placing information in the second submission table, in other example embodiments, one or more of these pieces of information may be stored in the first submission table.

If operation 508 is utilized, then the fact that the transaction identification is encrypted and is the only mechanism by which to link the confidential data in the first submission table with the user identification in the second submission table through a join operation provides an additional layer of security.

FIG. 6 is a diagram illustrating an example of a first submission table 600 and a second submission table 602, in accordance with an example embodiment. Each row in each of the first and second submission tables 600, 602 corresponds to a different submission. Here, the first submission table 600 includes two columns. In a first column 604, transaction identification information encrypted by a first key is stored. In a second column 606, confidential data encrypted by a second key is stored.

The second submission table 602 includes five columns. In a first column 608, transaction identification information encrypted by the first key is stored. In a second column 610, identification of the user who submitted the corresponding confidential data, encrypted by a third key, is stored. In a third column 612, a timestamp for the submission is stored. In a fourth column 614, a first attribute of the user (here location) is stored. In a fifth column 616, a second attribute of the user, here job title, is stored. Of course, there may be additional columns to store additional attributes or other pieces of information related to the submission.

Notably, FIG. 6 depicts an example embodiment where only the first and second columns 608, 610 of the second submission table 602 are encrypted, using different encryption keys. In some example embodiments, the additional columns 612-616 may also be encrypted, either individually or together. Furthermore, in some example embodiments, the first and/or second submission tables 600, 602 may be additionally encrypted as a whole, using an additional encryption key(s) different from the keys described previously.

It should be noted that while FIGS. 5 and 6 describe the confidential data as being stored in a single column in a first submission table, in some example embodiments this column is actually multiple columns, or multiple sub-columns, with each corresponding to a subset of the confidential data. For example, if the confidential data is compensation information, the confidential data may actually comprise multiple different pieces of compensation information, such as base salary, bonus, stock, tips, and the like. Each of these pieces of compensation information may, in some example embodiments, have its own column in the first submission table. Nevertheless, the processes described herein with regard to the "column" in which the confidential data is stored apply equally to the embodiments where multiple columns are used (e.g., the individual pieces of compensation information are still encrypted separately from the user identification information).

Since insights from submitted confidential data will be generated and shared with users who submit confidential data, there is a concern that the submitted confidential data upon which the insights are based be reliable. However, it can be difficult to generate reliable insights when confidential data is sparse.

In an example embodiment, a machine learning model is utilized to predict confidential data values for a member based on other members' submitted confidential data values and a social networking profile for the member. Specifically, a confidential data value prediction model is trained using a machine learning algorithm.

Figure 7:
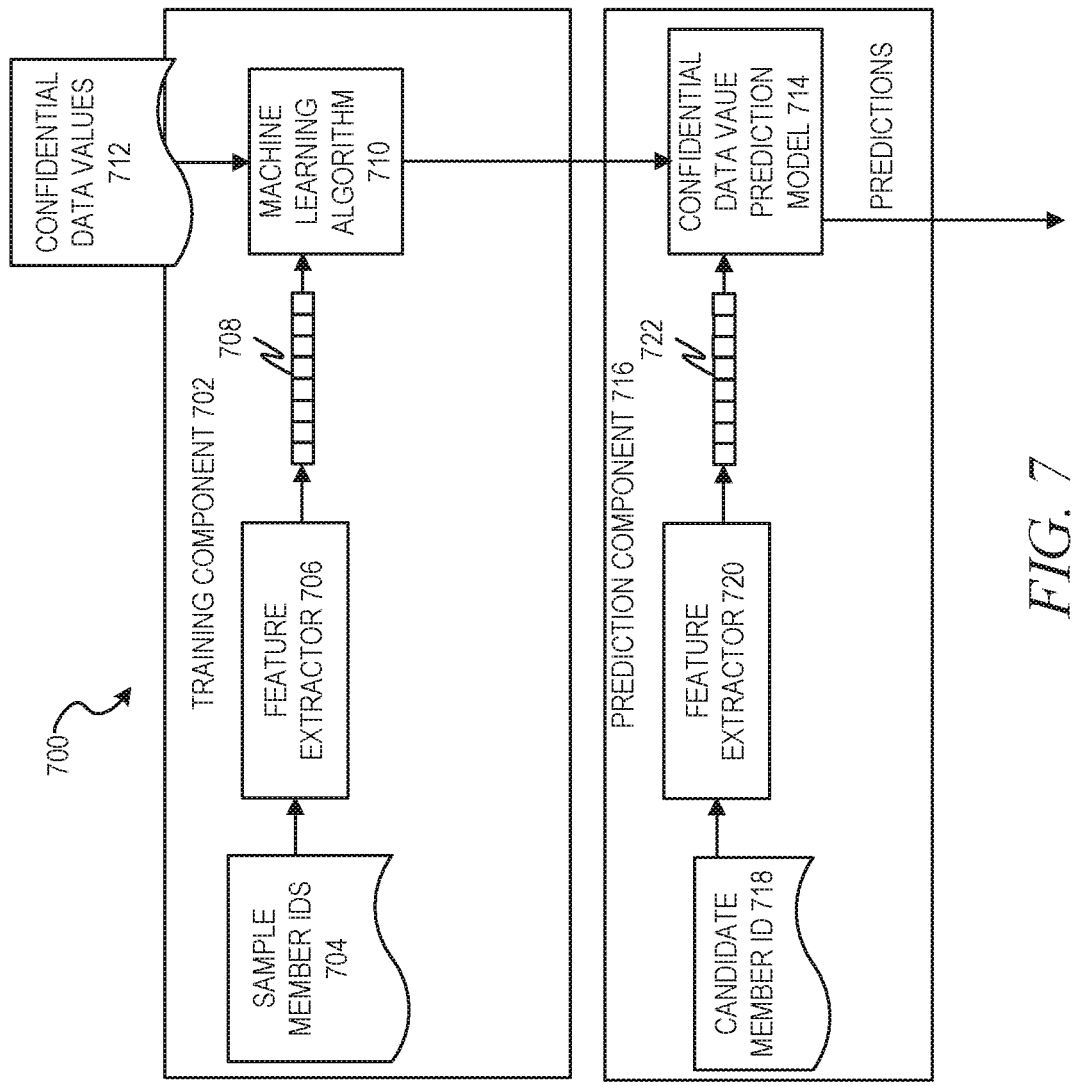
FIG. 7 is a block diagram illustrating a confidential data value machine learning algorithm component, in accordance with an example embodiment.

FIG. 7 is a block diagram illustrating a confidential data value machine learning algorithm component 700, in accordance with an example embodiment. In some example embodiments, the confidential data value machine learning algorithm component 700 may be located on the confidential data backend 106.

In a training component 702, a list of member identifications 704 is fed to a feature extractor 706, which acts to extract curated features 708 from member profiles retrieved using the member identifications 704.

There are number of different features that the feature extractor 706 may extract from the member profiles, including, but not limited to:
  i. Canonical (standardized) version of the member's job title (possibly converted to binarized version: IsTitleEqualToX for each standardized title, X)
  ii. Canonical supertitle (title cluster), possibly binarized
  iii. Canonical function, possibly binarized
  iv. Canonical company
  v. Canonical company group vi. Canonical industry
vii. Canonical industry group
viii. Canonical location city, region, state, country
ix. Years of experience in current function
x. Total years of experience
xi. Canonical skills, along with weights denoting the extent to which the user possesses each skill
   1. The weights could be obtained based on endorsements/significance score
xii. Previous companies/industries
xiii. Previous titles/functions
xiv. Number of position changes
xv. Tenure in the current job
xvi. Education history
   1. Universities attended
   2. Highest level of degree
   3. Field of study
   4. Standardized test scores (SAT CAE, etc.)
xvii. Publications
   1. Number of technical publications
   2. Number of citations
   3. Metrics such as h-index for the user
xviii. Patents
   1. Number of patents
   2. Number of citations
   3. Metrics such as h-index for the user with respect to the patents
xix. Professional associations/groups
xx. Connections
   1. Number of connections
   2. Combined "reputation" of the connections
   3. Number of requests for connections, weighted by the reputations of the potential connecting users
   4. Number of messages from recruiters, weighted by the reputation of each recruiter/company
xxi. Job seeking propensity score
xxii. Mentions in reputable news articles (time weighted) and web searches.

Extraction may be performed via a number of different extraction techniques. In an example embodiment, the features may be directly extracted from the relevant member profiles, taken from metadata associated with the member profiles, or retrieved from usage information saved for members associated with the relevant member profiles. In other example embodiments, more complex transformations and/or pre-processing may be performed, such as mapping of the features to social network attribute taxonomy categories or computation of metrics.

The curated features 708 may be fed to a machine learning algorithm 710 along with confidential data values 712 for each of the member identifications in the list of member identifications 704. The machine learning algorithm 710 then trains a confidential data value prediction model 714 based on the curated features 708 and confidential data values 712. The machine learning algorithm 710 may be selected from among many different potential supervised or unsupervised machine learning algorithms. Examples of supervised machine learning algorithms include artificial neural networks, Bayesian networks, instance-based learning, support vector machines, random forests, linear classifiers, quadratic classifiers, k-nearest neighbor, decision trees, and hidden Markov models. Examples of unsupervised machine learning algorithms include expectation-maximization algorithms, vector quantization, and information bottleneck methods. In an example embodiment, a binary logistic regression model is used. Binary logistic regression deals with situations in which the observed outcome for a dependent variable can have only two possible types. Logistic regression is used to predict the odds of one case or the other being true based on values of independent variables (predictors).

Specifically, the confidential data value prediction model 714 may be trained to output predictions for various confidential data values for an input member identification (based on retrieval of a member profile corresponding to the member identification). For example, base salary and/or total compensation could be predicted. In some example embodiments, the confidential data value prediction model 714 additionally outputs a confidence score for each prediction, which allows the system to decide whether or not to use the prediction for a particular insight, based on whether the confidence score exceeds a particular threshold. In some example embodiments, different insights may have different thresholds, based on a different need for accuracy in the predictions for different types of insight statistical functions.

In a prediction component 716, a candidate member identification 718 is fed to a feature extractor 720, which acts to extract curated features 722 from a member profile corresponding to the candidate member identification 718. The curated features 722 are then used as input to the trained confidential data value prediction model 714, which outputs predictions for confidential data value(s) (as well as possibly confidence scores) for the member having the candidate member identification 718.

It should be noted that while the feature extractor 706 and the feature extractor 720 are depicted as separate components, they may be the same component in some example embodiments. Additionally, a large number of different types of features could be extracted using the feature extractors 706 and 720. Furthermore, while in an example embodiment the features extracted by the feature extractor 706 are the same as the features extracted by the feature extractor 720, in other example embodiments there may be differences in the features.

In one example embodiment, a matrix formed by the features extracted by the feature extractor 706 and/or feature extractor 720 is mapped to a low-dimensional space to compensate for the fact that many features may be sparse and related. If the number of users is denoted by n and the number of features is denoted by m, then an m×k dimensionality reduction matrix NI can be derived using a dimensionality reduction technique, such as Singular Value Decomposition (SVD), Linear Discriminate Analysis (LDA), or random projection, where k is less than n. The machine learning algorithm 710 may then train the confidential data value prediction model 714 based on this low-dimensional space.

In other example embodiments, the confidential data value predictions may be used for more than just providing insights. For example, the confidential data value predictions may be used as part of job searches and job recommendations, as part of a system where recruiters are searching for candidates or recommending candidates for a job.

It should also be noted that regardless of how the confidential data, value predictions are used, opt-in consent is obtained from members prior to using the predicted confidential data values for any purposes, thus ensuring that member privacy is maintained.

Figure 8:
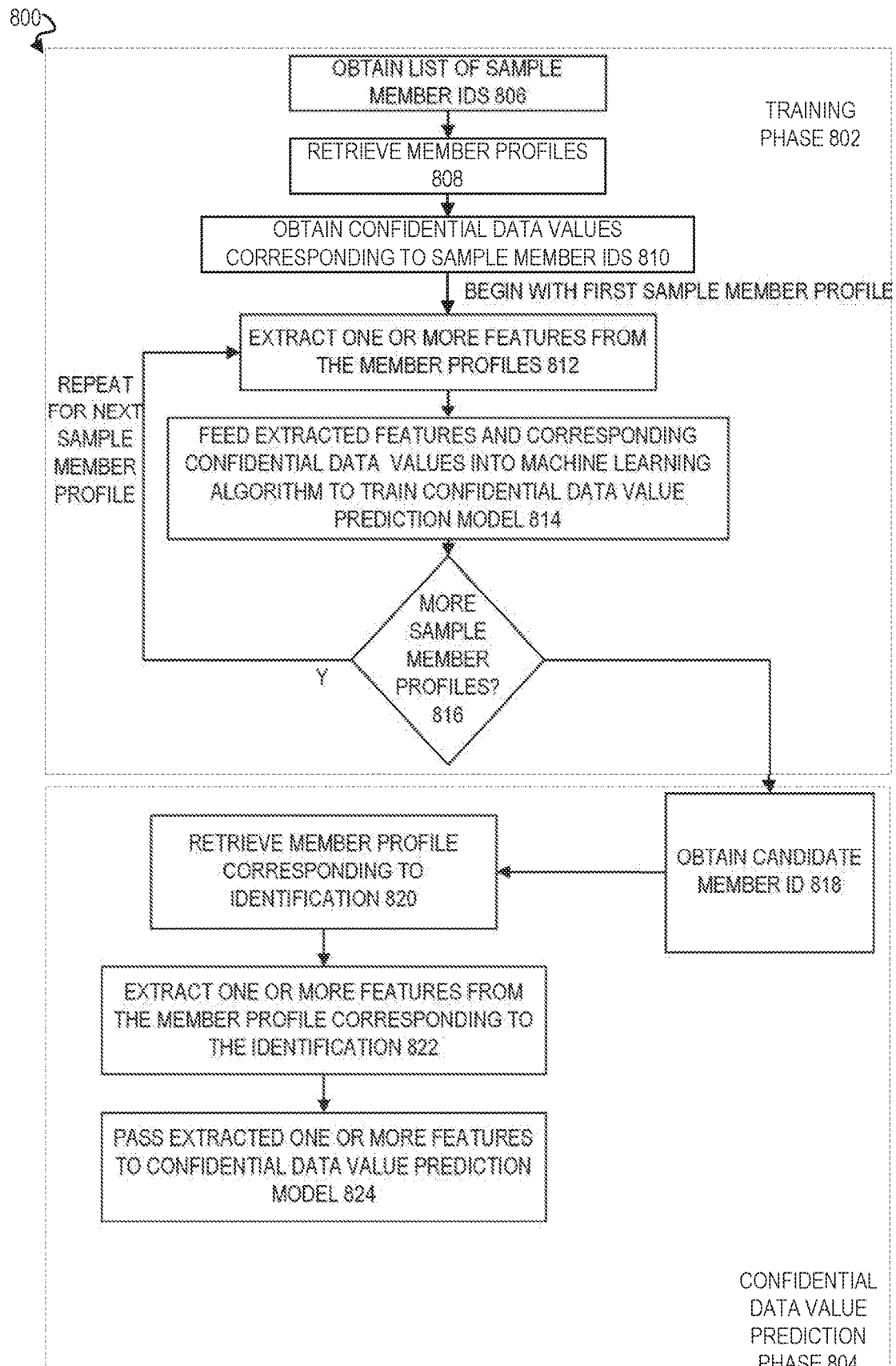
FIG. 8 is a flow diagram illustrating a method for predicting confidential data values in a computer system, in accordance with an example embodiment.

FIG. 8 is a flow diagram illustrating a method 800 for predicting confidential data values in a computer system, in accordance with an example embodiment. The method 800 may be broken into a training phase 802 and a confidential data value prediction phase 804. In the training phase 802, at operation 806, a list of sample member identifications is obtained. At operation 808, member profiles corresponding to each of the sample member identifications are retrieved. At operation 810, confidential data values corresponding to the sample member identifications are obtained. A loop is then begun for each of the retrieved member profiles. At operation 812, one or more features are extracted from the member profile. At operation 814, the extracted one or more features and the confidential data value(s) corresponding to the member identification of the member profile are fed into a machine learning algorithm to train a confidential data value prediction model based on the extracted one or more features.

At operation 816, it is determined if there are any more member profiles to examine. If so, then the method 800 loops back to operation 812 for the next member profile. If not, then in the confidential data value prediction phase 804, at operation 818, a candidate member identification is obtained. At operation 820, a member profile corresponding to the candidate member identification is retrieved. At operation 822, one or more features are extracted from the member profile corresponding to the candidate member identification. At operation 824, the extracted one or more features from the member profile corresponding to the candidate member identification are passed to the confidential data value prediction model to generate a predicted confidential data value.

In another example embodiment, a machine learning model is utilized to predict confidential data values for a job position in a job posting based on other job postings. Specifically, a confidential data value prediction model is trained using a machine learning algorithm.

Figure 9:
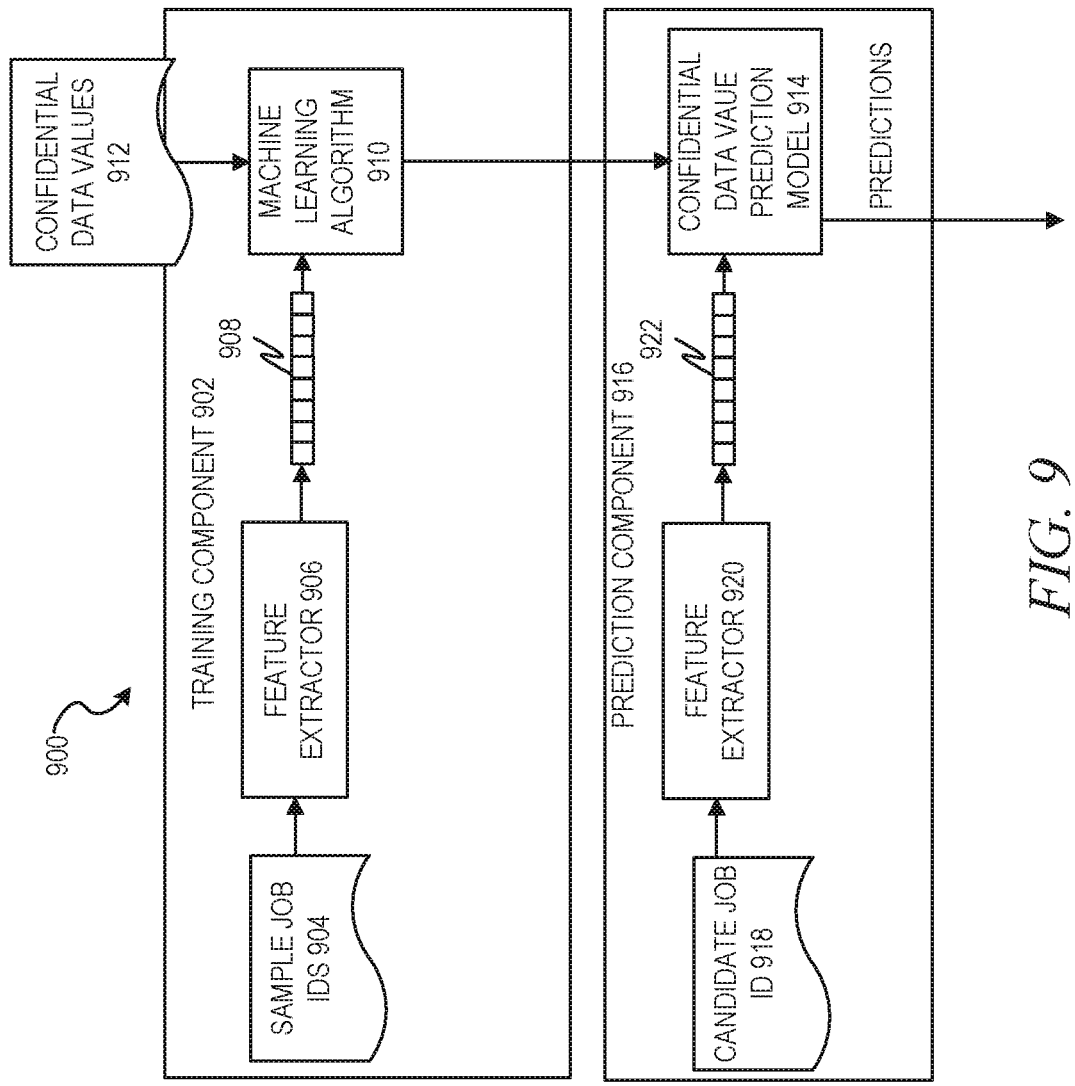
FIG. 9 is a block diagram illustrating a confidential data value machine learning algorithm component, in accordance with another example embodiment.

FIG. 9 is a block diagram illustrating a confidential data value machine learning algorithm component 900, in accordance with another example embodiment. In some example embodiments, the confidential data value machine learning algorithm component 900 may be located on the confidential data backend 106.

In a training component 902, a list of jab identifications 904 is fed to a feature extractor 906, which acts to extract curated features 908 from job postings retrieved using the job identifications 904.

There are number of different features that the feature extractor 906 may extract from the job postings, including, but not limited to:
  i. Canonical (standardized) version of the job title (possibly converted to binarized version: IsTitleEqualToX for each standardized title, X)
  ii. Canonical supertitle (title cluster), possibly binarized
  iii. Canonical function, possibly binarized
  iv. Canonical company
  v. Canonical company group
  vi. Canonical industry
  vii. Canonical industry group
  viii. Canonical location city, region, state, country
  ix. Years of experience needed for the job
  x. Seniority level of the job, inferred based on members with similar positions to the job and on members who have viewed or applied to the job
  xi. Canonical skills, along with weights denoting the extent to which the job requires the skill
    1. The weights could be obtained based on mapping the job posting to the skills graph, to members with similar positions to the job, and to members who have viewed or applied to the job
  xii. Educational qualification
    1. Preferred level of degree
    2. Required level of degree
    3. Field of study Extraction may be performed via a number of different extraction techniques. In an example embodiment, the features may be directly extracted from the relevant member profiles, taken from metadata associated with the member profiles, or retrieved from member usage information. In other example embodiments, more complex transformations and/or pre-processing may be performed, such as mapping of the features to social network attribute taxonomy, categories or computation of metrics.

The curated features 908 may be fed to a machine learning algorithm 910 along with confidential data values 912 for each of the job postings corresponding to the job identifications 904. The confidential data values 912 may be, for example, explicitly provided by a job poster associated with a job posting. Alternatively, a trainer may assign the confidential data values 912 to each job posting. In another example embodiment, the job identifications 904 are associated with job postings that have been filled by members who have submitted confidential data values for their compensation amounts, and thus the confidential data values 912 associated with the job identifications 904 can be obtained from this submitted confidential data value information.

The machine learning algorithm 910 then trains a confidential data value prediction model 914 based on the curated features 908 and confidential data values 912. The machine learning algorithm 910 may be selected from among many different potential supervised or unsupervised machine learning algorithms. Examples of supervised machine learning algorithms include artificial neural networks, Bayesian networks, instance-based learning, support vector machines, random forests, linear classifiers, quadratic classifiers, k-nearest neighbor, decision trees, and hidden Markov models, Examples of unsupervised machine learning algorithms include expectation-maximization algorithms, vector quantization, and information bottleneck methods. In an example embodiment, a binary logistic regression model is used. Binary logistic regression deals with situations in which the observed outcome for a dependent variable can have only two possible types. Logistic regression is used to predict the odds of one case or the other being true based on values of independent variables (predictors).

Specifically, the confidential data value prediction model 914 may be trained to output predictions for various confidential data values for an input job identification (based on retrieval of a job posting corresponding to the job identification). For example, base salary and/or total compensation could be predicted. In some example embodiments, the confidential data value prediction model 914 additionally outputs a confidence score for each prediction, which allows the system to decide whether or not to use the prediction for a particular insight, based on whether the confidence score exceeds a particular threshold. In some example embodiments, different insights may have different thresholds, based on a different need for accuracy in the predictions for different types of insight statistical functions.

In a prediction component 916, a candidate job identification 918 is fed to a feature extractor 920, which acts to extract curated features 922 from a job posting corresponding to the job identification 918. The curated features 922 are then used as input to the trained confidential data value prediction model 914, which outputs predictions for confidential data value(s) (as well as possibly confidence scores) for the job posting having the job identification 918.

It should be noted that while the feature extractor 906 and the feature extractor 920 are depicted as separate components, they may be the same component in some example embodiments. Additionally, a large number of different types of features could be extracted using the feature extractors 906 and 920. Furthermore, while in an example embodiment the features extracted by the feature extractor 906 are the same as the features extracted by the feature extractor 920, in other example embodiments there may be differences in the features.

In one example embodiment, a matrix formed by the features extracted by the feature extractor 906 and/or feature extractor 920 is mapped to a low-dimensional space to compensate for the fact that many features may be sparse and related. If the number of jobs is denoted by n and the number of features is denoted by m, then an m×k dimensionality reduction matrix M can be derived using a dimensionality reduction technique, such as SVD, LDA, or random projection, where k is less than n. The machine learning algorithm 910 may then train the confidential data value prediction model 914 based on this low-dimensional space.

In other example embodiments, the confidential data value predictions may be used for more than just providing insights. For example, the confidential data value predictions may be used as part of job searches and job recommendations, as part of a system where recruiters are searching for candidates or recommending candidates for a job.

It should also be noted that regardless of how the confidential data value predictions are used, opt-in consent is obtained from members prior to using the predicted confidential data values for any purposes, thus ensuring that member privacy is maintained.

Figure 10:
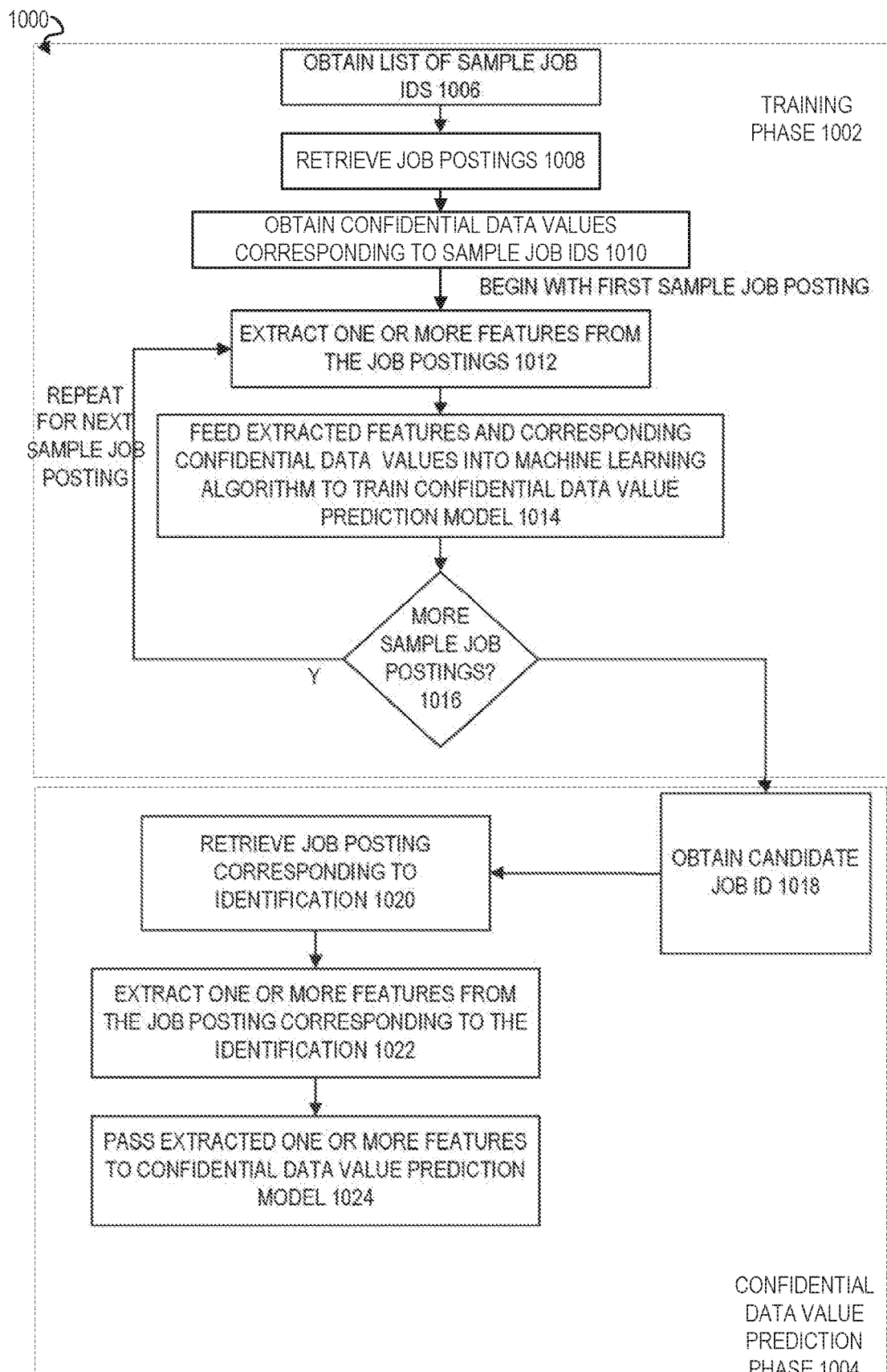
FIG. 10 is a flow diagram illustrating a method for predicting confidential data values in a computer system, in accordance with another example embodiment.

FIG. 10 is a flow diagram illustrating a method 1000 for predicting confidential data values in a computer system, in accordance with another example embodiment. The method 1000 may be broken into a training phase 1002 and a confidential data value prediction phase 1004. In the training phase 1002, at operation 1006, a list of sample job identifications is obtained. At operation 1008, job postings corresponding to each of the sample job identifications are retrieved. At operation 1010, confidential data values corresponding to each of the sample job identifications are obtained. A loop is then begun for each of the retrieved job postings. At operation 1012, one or more features are extracted from the job posting. At operation 1014, the extracted one or more features and the confidential data value(s) corresponding to the job identification of the job posting are fed into a machine learning algorithm to train a confidential data value prediction model based on the extracted one or more features.

At operation 1016, it is determined if there are any more job postings to examine. If so, then the method 1000 loops back to operation 1012 for the next job posting. If not, then in the confidential data value prediction phase 1004, at operation 1018, a candidate job identification is obtained. At operation 1020, a job posting corresponding to the candidate job identification is retrieved. At operation 1022, one or more features are extracted from the job posting corresponding to the candidate job identification. At operation 1024, the extracted one or more features from the job posting corresponding to the candidate job identification are passed to the confidential data value prediction model to generate a predicted confidential data value.

Figure 11A:
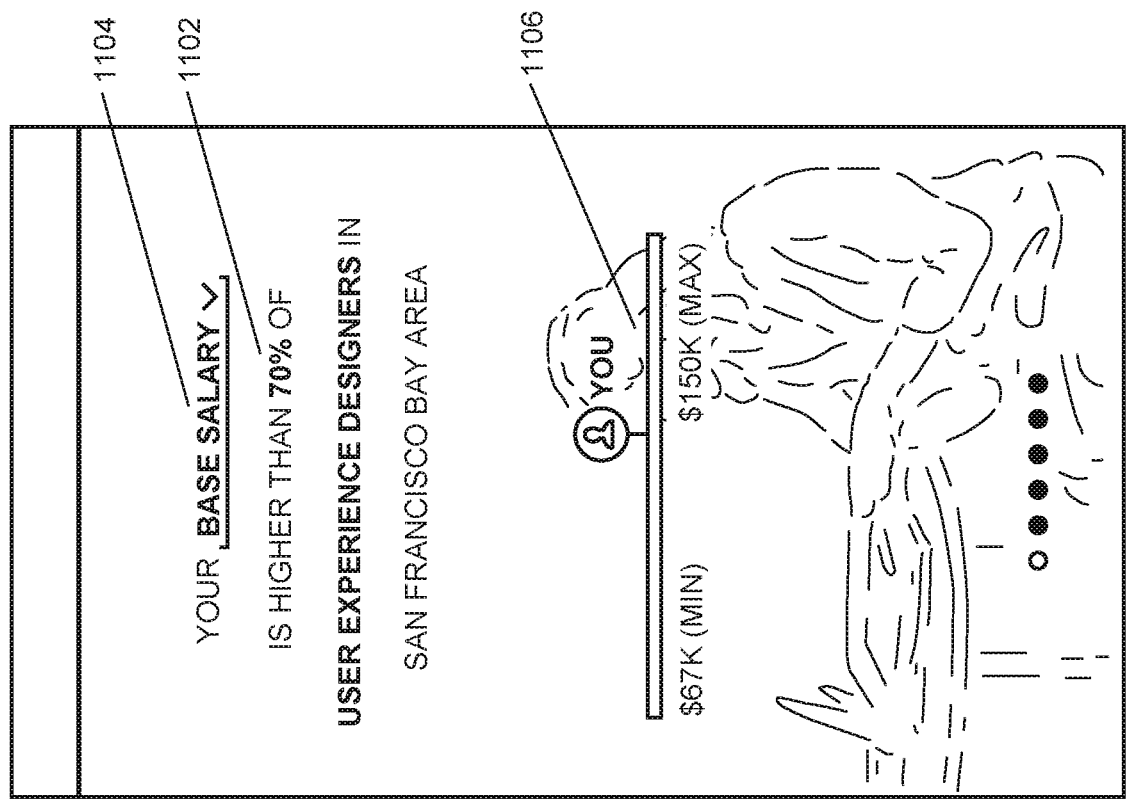
FIGS. 11A-11C are screen captures illustrating a user interface for displaying insights to a first user from confidential data submitted by other users, in accordance with an example embodiment.
Figure 11B:
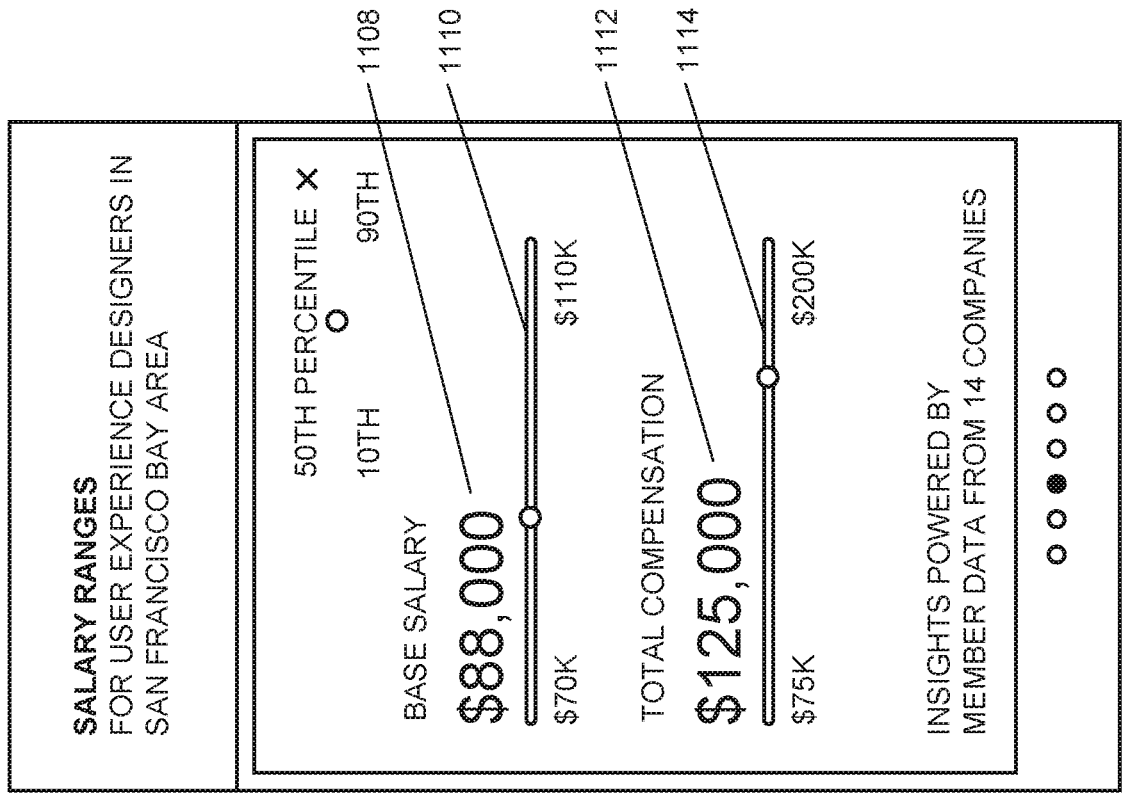
Figure 11C:
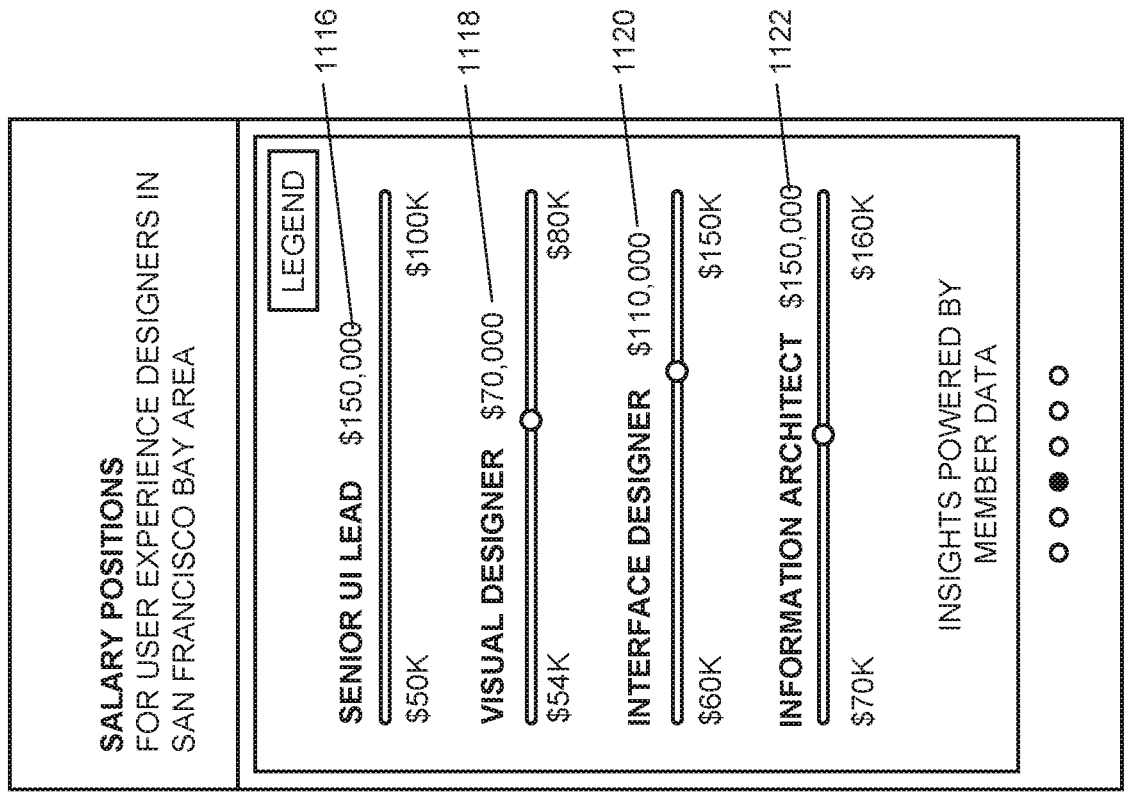

FIGS. 11A-11C are screen captures illustrating a user interface 1100 for displaying insights to a first user from confidential data submitted by other users, in accordance with an example embodiment. Referring first to FIG. 11A, the user interface 1100 displays a metric 1102 comparing confidential data of the first user to confidential data of other users in a same slice as the first user. Here, for example, the first user is able to see that his or her base salary (as selectable via a drop-down menu 1104) is higher than that of 70% of other users in the same slice (the slice being depicted as User Experience Designers in the San Francisco Bay Area). This metric is also displayed as a graphic 1106 for easy comparison.

Referring now to FIG. 11B, the user interface 1100 displays salary ranges for users in the same slice as the first user, including a median base salary 1108, a range of submitted base salaries 1110, a median total compensation 1112, and a range of submitted total compensations 1114.

Referring now to FIG. 11C, the user interface 1100 displays insights 1116, 1118, 1120, and 1122 for positions related to the position of the first user. Notably, these insights 1116, 1118, 1120, and 1122 may require using information from slices other than the one the first user belongs to. In an example embodiment, there is no limitation on the confidential data frontend 104 retrieving insights from the confidential data insights data store 122 that come from slices different from ones to which the user being presented with the insights belongs, although in some example embodiments, the confidential data frontend 104 may itself limit the first user's ability to ask for and/or view certain types of information (e.g., the confidential data frontend 104 may permit the first user to view salary information for positions related to the first user's own position, but not for unrelated positions)

As depicted above, all of the insights may be statistical information derived from confidential data submitted by users other than the user viewing the insights (as well as potentially including the user's own confidential data as well).

Notably, insights can be retrieved in response to a query. This query may be user-generated or machine-generated. These queries may include values for one or more attributes that define a cohort, as described above. For example, the query may be "show base salaries for computer programmers in Seattle" or "show total compensation for accounting jobs in California." While the initial query may indicate a particular level of granularity for one or more of the attributes (e.g., California is at the state level of granularity, whereas country, region, and city could be different levels of granularity for location), it is common for there not to be enough data to make a relevant insight at the initially specified level of granularity. Generalizing of course improves the reliability of the insight; but makes it less relevant to the user (e.g., if a user wants to know base salaries for computer programmers in Seattle, the system could return an average base salary for all tech workers in the U.S., which would be a fairly reliable statistical insight due to the plethora of data points available, but such a generalized insight would be of little value to the user).

In order to address this issue, in an example embodiment statistical insights are automatically generated at a generalized level in a manner that generalizes as little as possible to provide a desired level of reliability. Specifically, the initial query is mapped into a hierarchy for each specified attribute in the initial query. Then a cohort score is calculated for the combination of attributes in the initial query that indicates the cohort. This cohort score is a weighted combination of a confidence score for the cohort and a granularity score for the cohort. These scores will be described in more detail below.

Then all possible generalizations of the cohort within the hierarchies of the attributes specified in the initial query are determined, and the same type of cohort score calculation is performed for each of these generalizations. The generalization (including the cohort for the initial query) with the highest cohort score is then selected as the cohort upon which to perform a statistical calculation on submitted confidential data. The results of this statistical calculation can then be returned to the user as the most relevant and reliable insight.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application-Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-11 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Software Architecture

Figure 12:
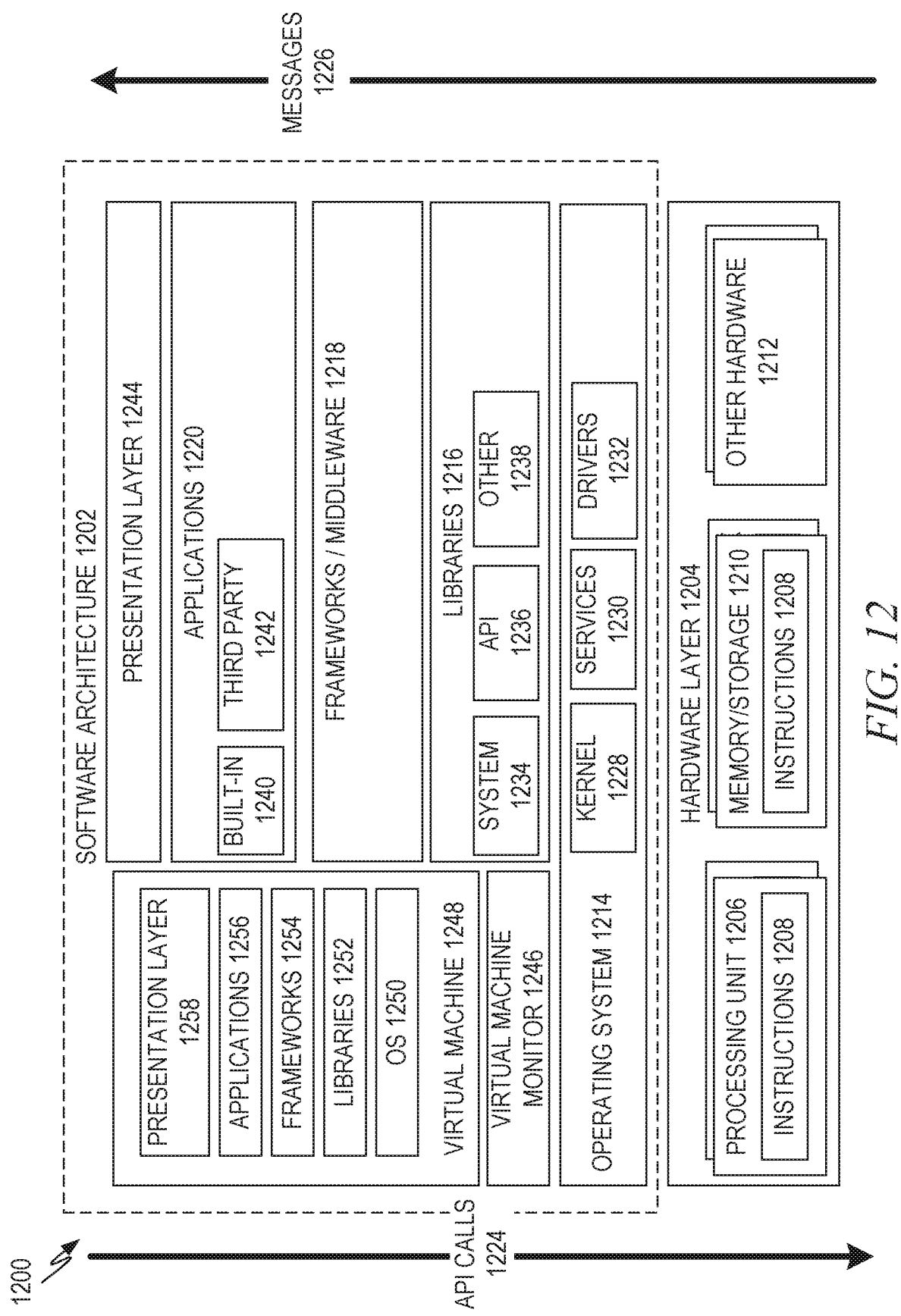
FIG. 12 is a block diagram illustrating a representative software architecture, which may be used in conjunction with various hardware architectures herein described.

FIG. 12 is a block diagram 1200 illustrating a representative software architecture 1202, which may be used in conjunction with various hardware architectures herein described. FIG. 12 is merely a non-limiting example of a software architecture, and it will be appreciated that many other architectures may be implemented to facilitate the functionality described herein. The software architecture 1202 may be executing on hardware such as a machine 1300 of FIG. 13 that includes, among other things, processors 1310, memory/storage 1330, and I/O components 1350. A representative hardware layer 1204 is illustrated and can represent, for example, the machine 1300 of FIG. 13. The representative hardware layer 1204 comprises one or more processing units 1206 having associated executable instructions 1208. The executable instructions 1208 represent the executable instructions of the software architecture 1202, including implementation of the methods, modules, and so forth of FIGS. 1-11. The hardware layer 1204 also includes memory and/or storage modules 1210, which also have the executable instructions 1208. The hardware layer 1204 may also comprise other hardware 1212, which represents any other hardware of the hardware layer 1204, such as the other hardware illustrated as part of the machine 1300.

In the example architecture of FIG. 12, the software architecture 1202 may be conceptualized as a stack of layers where each layer provides particular functionality. For example, the software architecture 1202 may include layers such as an operating system 1214, libraries 1216, frameworks/middleware 1218, applications 1220, and a presentation layer 1244. Operationally, the applications 1220 and/or other components within the layers may invoke API calls 1224 through the software stack and receive responses, returned values, and so forth, illustrated as messages 1226, in response to the API calls 1224. The layers illustrated are representative in nature and not all software architectures have all layers. For example, some mobile or special-purpose operating systems may not provide a layer of frameworks/middleware 1218, while others may provide such a layer. Other software architectures may include additional or different layers.

The operating system 1214 may manage hardware resources and provide common services. The operating system 1214 may include, for example, a kernel 1228, services 1230, and drivers 1232. The kernel 1228 may act as an abstraction layer between the hardware and the other software layers. For example, the kernel 1228 may be responsible for memory management, processor management (e.g., scheduling), component management, networking, security settings, and so on. The services 1230 may provide other common services for the other software layers. The drivers 1232 may be responsible for controlling or interfacing with the underlying hardware. For instance, the drivers 1232 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1216 may provide a common infrastructure that may be utilized by the applications 1220 and/or other components and/or layers. The libraries 1216 typically provide functionality that allows other software modules to perform tasks in an easier fashion than by interfacing directly with the underlying operating system 1214 functionality (e.g., kernel 1228, services 1230, and/or drivers 1232). The libraries 1216 may include system libraries 1234 (e.g., C standard library) that may provide functions such as memory allocation functions, string manipulation functions, mathematical functions, and the like. In addition, the libraries 1216 may include API libraries 1236 such as media libraries (e.g., libraries to support presentation and manipulation of various media formats such as MPEG4, H.264, MP3, AAC, AMR, JPG, PNG), graphics libraries (e.g., an OpenCit framework that may be used to render 2D and 3D graphic content on a display), database libraries (e.g., SQLite that may provide various relational database functions), web libraries (e.g., WebKit that may provide web browsing functionality), and the like. The libraries 1216 may also include a wide variety of other libraries 1238 to provide many other APIs to the applications 1220 and other software components/modules.

The frameworks 1218 (also sometimes referred to as middleware) may provide a higher-level common infrastructure that may be utilized by the applications 1220 and/or other software components/modules. For example, the frameworks 1218 may provide various graphic user interface (GUI) functions, high-level resource management, high-level location services, and so forth. The frameworks 1218 may provide a broad spectrum of other APIs that may be utilized by the applications 1220 and/or other software components/modules, some of which may be specific to a particular operating system or platform.

The applications 1220 include built-in applications 1240 and/or third-party applications 1242. Examples of representative built-in applications 1240 may include, but are not limited to, a contacts application, a browser application, a book reader application, a location application, a media application, a messaging application, and/or a game application. The third-party applications 1242 may include any of the built-in applications 1240 as well as a broad assortment of other applications. In a specific example, the third-party application 1242 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 1242 may invoke the API calls 1224 provided by the mobile operating system such as the operating system 1214 to facilitate functionality described herein.

The applications 1220 may utilize built-in operating system 1214 functions (e.g., kernel 1228, services 1230, and/or drivers 1232), libraries 1216 (e.g., system libraries 1234, API libraries 1236, and other libraries 1238), and frameworks/middleware 1218 to create user interfaces to interact with users of the system. Alternatively, or additionally, in some systems, interactions with a user may occur through a presentation layer, such as the presentation layer 1244. In these systems, the application/module "logic" can be separated from the aspects of the application/module that interact with a user.

Some software architectures utilize virtual machines. In the example of FIG. 12, this is illustrated by a virtual machine 1248. A virtual machine creates a software environment where applications/modules can execute as if they were executing on a hardware machine (such as the machine 1300 of FIG. 13, for example). A virtual machine is hosted by a host operating system (e.g., operating system 1214 in FIG. 12) and typically, although not always, has a virtual machine monitor 1246, which manages the operation of the virtual machine 1248 as well as the interface with the host operating system (e.g., operating system 1214). A software architecture executes within the virtual machine 1248, such as an operating system 1250, libraries 1252, frameworks/ middleware 1254, applications 1256, and/or a presentation layer 1258. These layers of software architecture executing within the virtual machine 1248 can be the same as corresponding layers previously described or may be different.

Example Machine Architecture and Machine-Readable Medium

Figure 13:
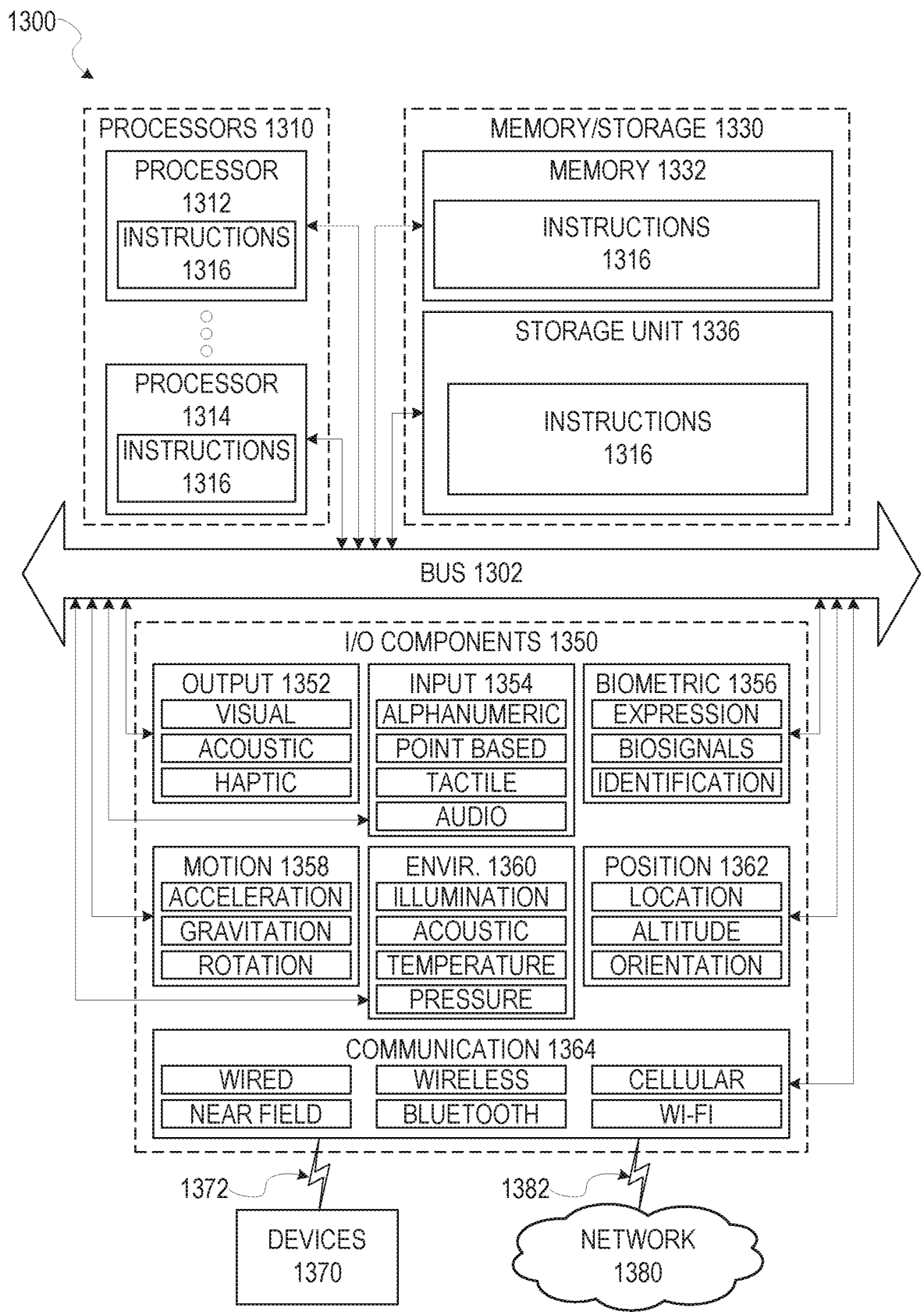
FIG. 13 is a block diagram illustrating components of a machine, according to some example embodiments, able to read instructions from a machine-readable medium (e.g., a machine-readable storage medium) and perform any one or more of the methodologies discussed herein.

FIG. 13 is a block diagram illustrating components of a machine 1300, according to some example embodiments, able to read instructions from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1316 (e.g., software, a program, an application, an apples, an app, or other executable code) for causing the machine 1300 to perform any one or more of the methodologies discussed herein may be executed. The instructions 1316 transform the general, non-programmed machine into a particular machine programmed to carry out the described and illustrated functions in the manner described. In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1316, sequentially or otherwise, that specify actions to be taken by the machine 1300. Further, while only a single machine 1300 is illustrated, the term "machine" shall also be taken to include a collection of machines 1300 that individually or jointly execute the instructions 1316 to perform any one or more of the methodologies discussed herein.

The machine 1300 may include processors 1310, memory/storage 1330, and I/O components 1350, which may be configured to communicate with each other such as via a bus 1302. In an example embodiment, the processors 1310 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1312 and a processor 1314 that may execute the instructions 1316. The term "processor" is intended to include multi-core processors that may comprise two or more independent processors (sometimes referred to as "cores") that may execute the instructions 1316 contemporaneously. Although FIG. 13 shows multiple processors 1310, the machine 1300 may include a single processor with a single core, a single processor with multiple cores (e.g., a multi-core processor), multiple processors with a single core, multiple processors with multiples cores, or any combination thereof.

The memory/storage 1330 may include a memory 1332, such as a main memory, or other memory storage, and a storage unit 1336, both accessible to the processors 1310 such as via the bus 1302. The storage unit 1336 and memory 1332 store the instructions 1316 embodying any one or more of the methodologies or functions described herein. The instructions 1316 may also reside, completely or partially, within the memory 1332, within the storage unit 1336, within at least one of the processors 1310 (e.g., within the processor's cache memory), or any suitable combination thereof, during execution thereof by the machine 1300. Accordingly, the memory 1332, the storage unit 1336, and the memory of the processors 1310 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 1316. The term "machine-readable medium" shall also be taken to include any medium, or combination of multiple media, that is capable of storing instructions (e.g., instructions 1316) for execution by a machine (e.g., machine 1300), such that the instructions, when executed by one or more processors of the machine (e.g., processors 1310), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1350 may include a wide variety of components to receive input, provide output, produce output, transmit information, exchange information, capture measurements, and so on. The specific I/O components 1350 that are included in a particular machine will depend on the type of machine. For example, portable machines such as mobile phones will likely include a touch input device or other such input mechanisms, while a headless server machine will likely not include such a touch input device. It will be appreciated that the I/O components 1350 may include many other components that are not shown in FIG. 13. The I/O components 1350 are grouped according to functionality merely for simplifying the following discussion and the grouping is in no way limiting. In various example embodiments, the I/O components 1350 may include output components 1352 and input components 1354. The output components 1352 may include visual components (e.g., a display such as a plasma display panel (PDP), a light emitting diode (LEI)) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1354 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1350 may include biometric components 1356, motion components 1358, environmental components 1360, or position components 1362, among a wide array of other components. For example, the biometric components 1356 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1358 may include acceleration sensor components (e.g., accelerometer), gravitation sensor components; rotation sensor components (e.g., gyroscope), and so forth. The environmental components 1360 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements; or signals corresponding to a surrounding physical environment. The position components 1362 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1350 may include communication components 1364 operable to couple the machine 1300 to a network 1380 or devices 1370 via a coupling 1382 and a coupling 1372, respectively. For example; the communication components 1364 may include a network interface component or other suitable device to interface with the network 1380. In further examples, the communication components 1364 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1370 may be another machine or any of a wide variety of peripheral devices (e.g., a peripheral device coupled via a USB).

Moreover, the communication components 1364 may detect identifiers or include components operable to detect identifiers. For example, the communication components 1364 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1364, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 1380 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a network, another type of network, or a combination of two or more such networks. For example, the network 1380 or a portion of the network 1380 may include a wireless or cellular network and the coupling 1382 may be a Code Division Multiple Access (CDMA) connection, a Global System for Mobile communications (GSM) connection, or another type of cellular or wireless coupling. In this example, the coupling 1382 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UNITS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1316 may be transmitted or received over the network 1380 using a transmission medium via a network interface device (e.g., a network interface component included in the communication components 1364) and utilizing any one of a number of well-known transfer protocols (e.g., Hypertext Transfer Protocol (HTTP)). Similarly, the instructions 1316 may be transmitted or received using a transmission medium via the coupling 1372 (e.g., a peer-to-peer coupling) to the devices 1370. The term "transmission medium" shall be taken to include any intangible medium that is capable of storing, encoding, or carrying the instructions 1316 for execution by the machine 1300, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily, limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
   A non-transitory machine-readable storage medium having instructions stored thereon, which, when executed by a processor, cause the system to:
   obtain one or more job postings from an online network, the one or more job postings having been posted to the online network by one or more job posters;
   obtain compensation values corresponding to the one or more job postings, the compensation values having been submitted to the online network by one or more users of the online network different than the one or more job posters;
   extract a first set of one or more features from the one or more job postings;
   feed the first set of one or more features and corresponding compensation values into a machine learning algorithm to train a compensation value prediction model to output a compensation value for a candidate job posting;
   retrieve a first candidate job posting from a data store of the online network, the first candidate job posting having been posted to the online network;
   extract a second set of one or more features from the retrieved first candidate job posting; and
   feed the extracted second set of one or more features to the compensation value prediction model, outputting the predicted compensation value.

2. The system of claim 1, wherein the first set of one or more features and the second set of one or more features are identical.

3. The system of claim 1, wherein the compensation value prediction model is further trained to output a confidence score for each confidential data value prediction.

4. The system of claim 1, further comprising calculating a statistical function on compensation values, including the predicted compensation value.

5. The system of claim 3, wherein the instructions further cause the system to:
   determine, for a statistical function, a threshold confidence score;
   compare the confidence score to the threshold confidence score; and
   in response to a determination that the confidence score transgresses the threshold confidence score, calculate the statistical function on confidential data values, including the predicted compensation value.

6. The system of claim 1, wherein the machine learning algorithm is a logistical regression algorithm.

7. The system of claim 1, wherein the machine learning algorithm is unsupervised.

8. A computerized method comprising:
   obtaining one or more job postings from an online network, the one or more job postings having been posted to the online network by one or more job posters;
   obtaining compensation values corresponding to the one or more job postings, the compensation values having been submitted to the online network by one or more users of the online network different than the one or more job posters;
   extracting a first set of one or more features from the one or more job postings;
   feeding the first set of one or more features and corresponding compensation values into a machine learning algorithm to train a compensation value prediction model to output a compensation value for a candidate job posting;
   retrieving a first candidate job posting from a data store of the online network, the first candidate job posting having been posted to the online network;
   extracting a second set of one or more features from the retrieved first candidate job posting; and
   feeding the extracted second set of one or more features to the compensation value prediction model, outputting the predicted compensation value.

9. The method of claim 8, wherein the first set of one or more features and the second set of one or more features are identical.

10. The method of claim 8, wherein the compensation value prediction model is further trained to output a confidence score for each confidential data value prediction.

11. The method of claim 8, calculating a statistical function on compensation values, including the predicted compensation value.

12. The method of claim 10, further comprising:
    determining, for a statistical function, a threshold confidence score;
    comparing the confidence score to the threshold confidence score; and
    in response to a determination that the confidence score transgresses the threshold confidence score, calculating the statistical function on confidential data values, including the predicted compensation value.

13. The method of claim 8, wherein the machine learning algorithm is a logistical regression algorithm.

14. The method of claim 8, wherein the machine learning algorithm is unsupervised.

15. A non-transitory machine-readable storage medium comprising instructions, which when implemented by one or more machines, cause the one or more machines to perform operations comprising:
- obtaining one or more job postings from an online network, the one or more job postings having been posted to the online network by one or more job posters;
- obtaining compensation values corresponding to the one or more job postings, the compensation values having been submitted to the online network by one or more users of the online network different than the one or more job posters;
- extracting a first set of one or more features from the one or more job postings;
- feeding the first set of one or more features and corresponding compensation values into a machine learning algorithm to train a compensation value prediction model to output a compensation value for a candidate job posting;
- retrieving a first candidate job posting from a data store of the online network, the first candidate job posting having been posted to the online network;
- extracting a second set of one or more features from the retrieved first candidate job posting; and
- feeding the extracted second set of one or more features to the compensation value prediction model, outputting the predicted compensation value.

16. The non-transitory machine-readable storage medium of claim 15, wherein the first set of one or more features and the second set of one or more features are identical.

17. The non-transitory machine-readable storage medium of claim 15, wherein the compensation value prediction model is further trained to output a confidence score for each confidential data value prediction.

18. The non-transitory machine-readable storage medium of claim 15, calculating a statistical function on compensation values, including the predicted compensation value.

19. The non-transitory machine-readable storage medium of claim 17, wherein the instructions further comprise:
- determining, for a statistical function, a threshold confidence score;
- comparing the confidence score to the threshold confidence score; and
- in response to a determination that the confidence score transgresses the threshold confidence score, calculating the statistical function on confidential data values, including the predicted confidential data value.

20. The non-transitory machine-readable storage medium of claim 15, wherein the machine learning algorithm is a logistical regression algorithm.

* * * * *